(12) United States Patent
Nagase et al.

(10) Patent No.: US 11,905,432 B2
(45) Date of Patent: Feb. 20, 2024

(54) COATING COMPOSITION AND COATING FILM

(71) Applicant: NIPPON PAINT MARINE COATINGS CO., LTD., Osaka (JP)

(72) Inventors: Yasuhisa Nagase, Osaka (JP); Tomoya Mori, Osaka (JP); Mamoru Shimada, Osaka (JP)

(73) Assignee: NIPPON PAINT MARINE COATINGS CO., LTD., Osaka (JP)

( * ) Notice: Subject to any disclaimer, the term of this patent is extended or adjusted under 35 U.S.C. 154(b) by 0 days.

(21) Appl. No.: 17/915,798

(22) PCT Filed: Jun. 28, 2022

(86) PCT No.: PCT/JP2022/025752
§ 371 (c)(1),
(2) Date: Sep. 29, 2022

(65) Prior Publication Data
US 2023/0416568 A1    Dec. 28, 2023

(51) Int. Cl.
| | | |
|---|---|---|
| C09D 183/10 | (2006.01) | |
| C08F 230/08 | (2006.01) | |
| C09D 183/06 | (2006.01) | |
| C09D 5/16 | (2006.01) | |
| C09D 7/43 | (2018.01) | |

(52) U.S. Cl.
CPC .......... C09D 183/10 (2013.01); C08F 230/08 (2013.01); C09D 5/165 (2013.01); C09D 5/1675 (2013.01); C09D 183/06 (2013.01); C09D 7/43 (2018.01)

(58) Field of Classification Search
CPC ............... C08F 230/08; C08F 230/04; C08F 220/1804; C08F 220/1805; C08F 220/1806; C08F 220/1807; C08F 220/1808; C08F 220/1809; C08F 220/181; C08F 220/1812; C08F 220/1818; C08F 220/20; C08F 220/285; C08F 220/286; C08F 220/287; C08F 220/288; C08F 220/283
See application file for complete search history.

(56) References Cited

U.S. PATENT DOCUMENTS

| | | | | |
|---|---|---|---|---|
| 4,883,852 A | | 11/1989 | Masuoka et al. | |
| 5,545,823 A | * | 8/1996 | Kuo | C09D 5/1662 524/265 |
| 2003/0158292 A1 | * | 8/2003 | Masuoka | C09D 5/165 523/122 |
| 2012/0202076 A1 | | 8/2012 | Ehara et al. | |
| 2012/0202080 A1 | | 8/2012 | Ehara et al. | |
| 2012/0294825 A1 | * | 11/2012 | Ehara | C09D 201/10 424/78.09 |
| 2018/0044551 A1 | * | 2/2018 | Ogawa | C08F 220/06 |
| 2020/0024472 A1 | * | 1/2020 | Moyano | C09D 175/04 |
| 2020/0254743 A1 | * | 8/2020 | Kiguchi | B32B 7/12 |
| 2021/0024770 A1 | * | 1/2021 | Yamamori | C08F 220/281 |
| 2021/0155831 A1 | * | 5/2021 | Jang | C09D 133/066 |
| 2021/0253918 A1 | * | 8/2021 | Kim | B32B 27/308 |
| 2021/0277292 A1 | * | 9/2021 | Kim | B32B 27/08 |
| 2022/0243104 A1 | * | 8/2022 | Choi | C08F 220/1804 |
| 2023/0015961 A1 | * | 1/2023 | Mori | C08F 290/068 |
| 2023/0312974 A1 | * | 10/2023 | Akizuki | C08G 18/792 106/287.1 |

FOREIGN PATENT DOCUMENTS

| | | | |
|---|---|---|---|
| EP | 3778673 A1 * | 2/2021 | |
| EP | 4019595 A1 * | 6/2022 | |
| EP | 4 039 759 A1 | 8/2022 | |
| JP | 62-283167 A | 12/1987 | |
| JP | 11-256071 A | 9/1999 | |
| JP | 11-256105 A | 9/1999 | |
| JP | 11256071 A * | 9/1999 | |
| JP | 2000-256610 A | 9/2000 | |
| JP | 2012-5934 A | 1/2012 | |
| WO | WO 2004/081121 * | 9/2004 | |
| WO | 2011/046086 A1 | 4/2011 | |
| WO | 2011/046087 A1 | 4/2011 | |
| WO | WO 2018/181429 * | 4/2018 | |
| WO | 2018/088377 A1 | 5/2018 | |
| WO | WO-2021033705 A1 * | 2/2021 | |

(Continued)

OTHER PUBLICATIONS

Machine translation of JP 11-256071 (no date).*
Japanese search report (no date).*
Machine translation of WO2021/033705 A1 (no date).*
Sigma Aldrich Polymer Properties Reference, Polymer Solutions: Solvents and Solubility Parameters) accessible at https://www.sigmaaldrich.com/deepweb/assets/sigmaaldrich/marketing/global/documents/919/972/polymer_solutions.pdf.*
Xylol product page accessible at https://www.sunnysidecorp.com/product.php?p=t&b=s&n=822G1.*

(Continued)

*Primary Examiner* — Marc S Zimmer
(74) *Attorney, Agent, or Firm* — Sughrue Mion, PLLC

(57) ABSTRACT

Provided is a coating composition containing a silicon atom-containing resin. The resin includes a constituent unit (A) derived from a monomer (a) having at least one kind of silicon atom-containing group selected from the group consisting of groups represented by formulae (I), (II), (III), and (IV), a constituent unit (B) derived from a monomer (b) which is a (meth)acrylic acid ester represented by a formula (b), and a constituent unit (C) derived from a monomer (c) other than the monomers (a) and (b). The monomer (a) has a molecular weight of greater than 2500. A content of the constituent unit (A) is greater than 20% by mass in all constituent units. The monomer (c) has a homopolymer solubility parameter SP of less than or equal to 9.5 and has no cyclic structure. A content of the unit (C) is greater than 2% by mass in all constituent units.

16 Claims, No Drawings

(56) References Cited

FOREIGN PATENT DOCUMENTS

WO        2021/065701 A1    4/2021
WO        WO-2021106902 A1 *  6/2021  ............... B05D 5/06

OTHER PUBLICATIONS

Solvent miscibility chart accessible at https://www.csustan.edu/sites/default/files/groups/Chemistry/Drake/documents/solvent_miscibility_table.pdf.*
Hildebrandt Solubility Parameter information as provided by chemeurope.com at https://www.chemeurope.com/en/encyclopedia/Hildebrand_solubility_parameter.html.*
International Search Report dated Sep. 20, 2022 in International Application No. PCT/JP2022/025752.
Suh et al., "Cohesive Energy Densities of Polymers from Turbidimetric Titrations", Journal Of Polymer Science: Part A-I, vol. 5, pp. 1671-1681 (1967).
Charles M. Hansen, "The Three Dimensional Solubility Parameter—Key to Paint Component Affinities: I. Solvents, Plasticizers, Polymers, and Resins", Journal of Paint Technology, vol. 39, No. 505, pp. 104-117 (1967).
Office Action dated Apr. 18, 2023 in Japanese Application No. 2022-562155.

* cited by examiner

COATING COMPOSITION AND COATING FILM

CROSS REFERENCE TO RELATED APPLICATIONS

This application is a National Stage of International Application No. PCT/JP2022/025752 filed Jun. 28, 2022.

TECHNICAL FIELD

The present invention relates to a coating composition containing a silicon atom-containing resin. The present invention also relates to a coating film formed from the coating composition, a composite coating film including the coating film, and a ship and an in-water structure provided with the coating film or the composite coating film.

BACKGROUND ART

In a ship, the adhesion of organisms such as barnacles, mussels, and algae cause problems such as hindrance of efficient travel and waste of fuel. Conventionally, an antifouling coating composition is applied on the surface of the ship in order to prevent the adhesion of organisms. For example, WO 2011/046086 (PTL 1) discloses an antifouling coating composition containing a silicon atom-containing resin as a vehicle and a thermoplastic resin and/or a plasticizer.

CITATION LIST

Patent Literature

PTL 1: WO 2011/046086

SUMMARY OF INVENTION

Technical Problem

When an object to be coated with an antifouling coating composition moves in water (for example, sea water) like a ship, a coating film formed from the antifouling coating composition is required to exhibit good antifouling performance while the object to be coated is moving.

An object of the present invention is to provide a coating composition capable of exhibiting good antifouling performance while an object to be coated is moving. Another object of the present invention is to provide a coating film formed from the coating composition, a composite coating film including the coating film, and a ship and an in-water structure provided with the coating film or the composite coating film.

Solution to Problem

The present invention provides the following coating composition, coating film, composite coating film, ship, and in-water structure.

[1] A coating composition containing a silicon atom-containing resin,
in which
the silicon atom-containing resin includes:
a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below;
a constituent unit (B) derived from a monomer (b) which is a (meth)acrylic acid ester represented by a formula (b) below; and
a constituent unit (C) derived from a monomer (c) other than the monomer (a) and the monomer (b),
the monomer (a) has a molecular weight of greater than 2500,
a content of the constituent unit (A) is greater than 20% by mass in all constituent units contained in the silicon atom-containing resin,
the monomer (c) is a monomer having a homopolymer solubility parameter SP of less than or equal to 9.5 and having no cyclic structure, and
a content of the constituent unit (C) is greater than 2% by mass in all constituent units contained in the silicon atom-containing resin:

[Chemical formula 1]

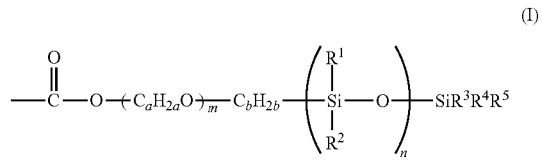

(I)

[in the formula (I), a and b each independently represent an integer of 2 to 5, m represents an integer of 0 to 50, and n represents an integer of 3 to 270; and $R^1$ to $R^5$ each independently represent an alkyl group, an alkoxy group, a phenyl group, a substituted phenyl group, a phenoxy group, or a substituted phenoxy group];

[Chemical formula 2]

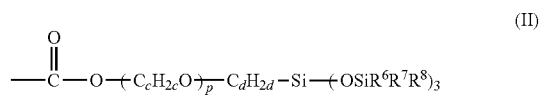

(II)

[in the formula (II), c and d each independently represent an integer of 2 to 5, and p represents an integer of 0 to 50; $R^6$, $R^7$, and $R^8$ each independently represent an alkyl group, $R^a$, or $R^b$;
$R^a$ is

[Chemical formula 3]

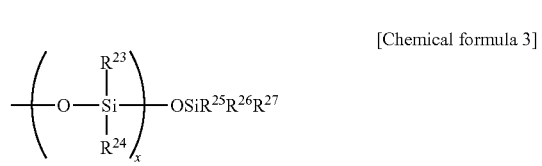

(in the formula, x represents an integer of 0 to 200; and $R^{23}$ to $R^{27}$ are the same or different and each represent an alkyl group); and
$R^b$ is

[Chemical formula 4]

(in the formula, y represents an integer of 1 to 200; and $R^{28}$ and $R^{29}$ are the same or different and each represent an alkyl group)];

[Chemical formula 5]

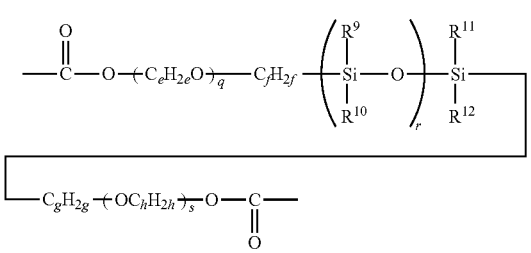

(III)

[in the formula (III), e, f, g, and h each independently represent an integer of 2 to 5, q and s each independently represent an integer of 0 to 50, and r represents an integer of 3 to 270; $R^9$ to $R^{12}$ each independently represent an alkyl group, an alkoxy group, a phenyl group, a substituted phenyl group, a phenoxy group, or a substituted phenoxy group];

[Chemical formula 6]

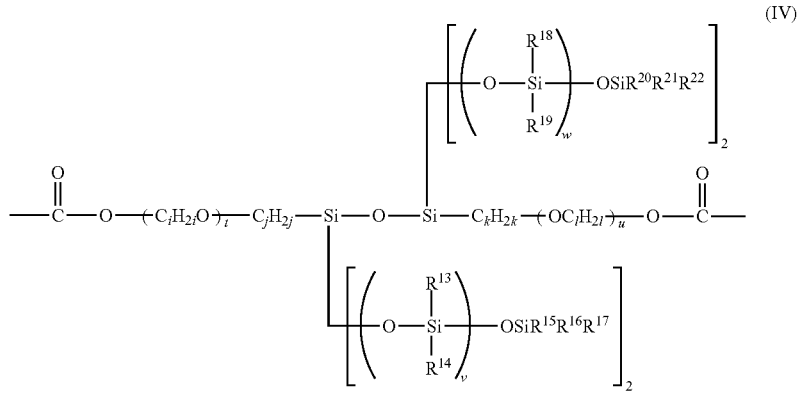

(IV)

[in the formula (IV), i, j, k, and l each independently represent an integer of 2 to 5, t and u each independently represent an integer of 0 to 50, and v and w each independently represent an integer of 0 to 70; and $R^{13}$ to $R^{22}$ are the same or different and each represent an alkyl group]; and

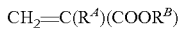  (b)

[in the formula (b), $R^A$ represents a hydrogen atom or a methyl group; and $R^B$ represents a monovalent group including one or more kinds selected from the group consisting of a hydroxyl group, a carboxy group, and an oxyalkylene chain].

[2] The coating composition according to [1], in which $R^B$ in the formula (b) represents a monovalent group containing an oxyalkylene chain.

[3] The coating composition according to [1] or [2], in which the monomer (a) is at least one kind selected from the group consisting of a monomer (a1) represented by a formula (I') below, a monomer (a2) represented by a formula (II') below, a monomer (a3) represented by a formula (III') below, and a monomer (a4) represented by a formula (IV') below:

[Chemical formula 7]

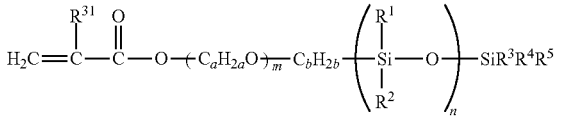

(I')

[in the formula (I'), $R^{31}$ represents a hydrogen atom or a methyl group, and a, b, m, n and $R^1$ to $R^5$ represent the same meaning as previously mentioned];

[Chemical formula 8]

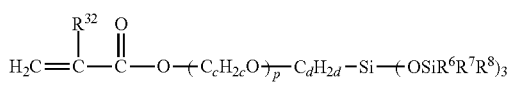

(II')

[in the formula (II'), $R^{32}$ represents a hydrogen atom or a methyl group, and c, d, p, and $R^6$ to $R^8$ represent the same meaning as previously mentioned];

[Chemical formula 9]

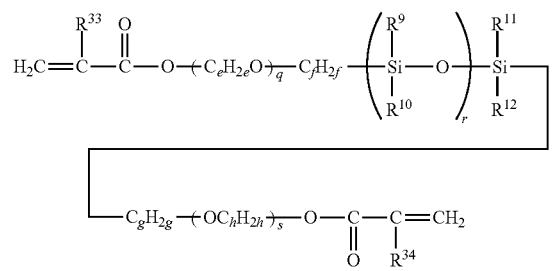

(III')

[in the formula (III'), $R^{33}$ and $R^{34}$ each independently represent a hydrogen atom or a methyl group, and e, f, g, h, q, r, s and $R^9$ to $R^{12}$ represent the same meaning as previously mentioned]; and

[Chemical formula 10]

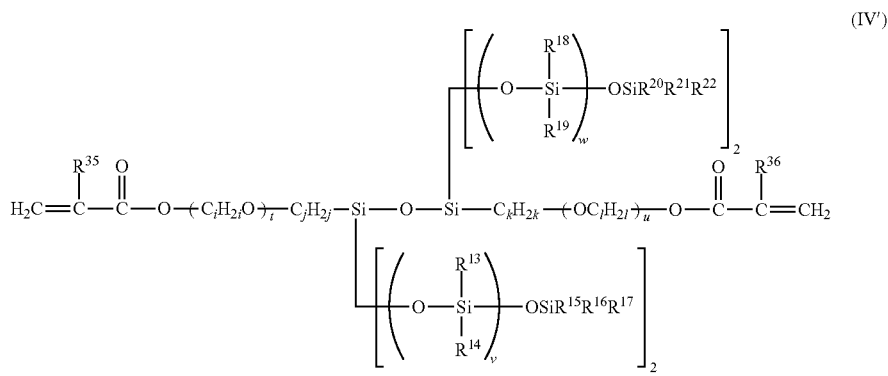

[in the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned].

[4] The coating composition according to any one of [1] to [3], further including a constituent unit (D) derived from a monomer (d) having a triorganosilyloxycarbonyl group.

[5] The coating composition according to [4], in which the monomer (d) is a monomer (d1) represented by a formula (VII') below.

[Chemical formula 11]

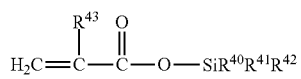

[in the formula (VII'), $R^{43}$ represents a hydrogen atom or a methyl group, and $R^{40}$, $R^{41}$ and $R^{42}$ are the same or different and each represent a hydrocarbon group having 1 to 20 carbon atoms].

[6] The coating composition according to any one of [1] to [5], in which a content of the constituent unit (B) is greater than or equal to 1% by mass and less than or equal to 30% by mass in all constituent units contained in the silicon atom-containing resin.

[7] The coating composition according to any one of [1] to [6], in which the monomer (b) has a homopolymer solubility parameter SP of greater than or equal to 10.0.

[8] The coating composition according to any one of [1] to [7], further containing at least one kind selected from the group consisting of a defoaming agent and an anti-sagging agent.

[9] The coating composition according to any one of [1] to [8], in which the silicon atom-containing resin further includes a constituent unit (E) derived from a monomer (e) having at least one kind of metal atom-containing group selected from the group consisting of a group represented by a formula (V) below and a group represented by a formula (VI) below:

[Chemical formula 12]

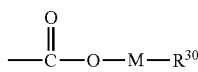

[in the formula (V), M represents a divalent metal atom, and $R^{30}$ represents an organic acid residue or an alcohol residue]; and

[Chemical formula 13]

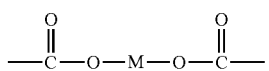

[in the formula (VI), M represents a divalent metal atom].

[10] The coating composition according to [9], in which the monomer (e) is at least one kind selected from the group consisting of a monomer (e1) represented by a formula (V') below and a monomer (e2) represented by a formula (VI') below:

[Chemical formula 14]

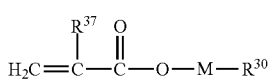

[in the formula (V'), $R^{37}$ represents a hydrogen atom or a methyl group, and M and $R^{30}$ represent the same meaning as previously mentioned]; and

[Chemical formula 15]

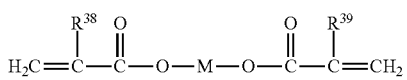

[in the formula (VI'), $R^{38}$ and $R^{39}$ each independently represent a hydrogen atom or a methyl group, and M represents the same meaning as previously mentioned].

[11] A coating film formed from the coating composition according to any one of [1] to [10].

[12] A composite coating film including a primer coating film formed from an antirust paint, and a coating film formed from the coating composition according to any one of [1] to [10] and overlaid on the primer coating film.

[13] A ship including the coating film according to [11] or the composite coating film according to [12].

[14] An in-water structure including the coating film according to [11] or the composite coating film according to [12].

Advantageous Effects of Invention

It is possible to provide a coating composition capable of exhibiting good antifouling performance while an object to be coated is moving. It is possible to provide a coating film formed from the coating composition, a composite coating film including the coating film, and a ship and an in-water structure including the coating film or the composite coating film.

DESCRIPTION OF EMBODIMENTS

<Coating Composition>

A coating composition according to the present invention (hereinafter, also simply referred to as a "coating composition") contains a specific silicon atom-containing resin described later. The coating composition according to the present invention makes it possible to form a coating film capable of exhibiting good antifouling performance while an object to be coated is moving. The coating composition according to the present invention makes it possible to form a coating film capable of exhibiting good antifouling performance for a long period of time while an object to be coated is moving. Hereinafter, the antifouling performance during movement is also referred to as "dynamic antifouling property". The coating composition according to the present invention can be suitably used as an antifouling coating composition to be applied to an underwater moving body such as a ship.

Hereinafter, components that are contained or may be contained in the coating composition will be described in detail.

(1) Silicon Atom-Containing Resin

The silicon atom-containing resin contained in the coating composition includes a constituent unit (A), a constituent unit (B), and a constituent unit (C). The constituent unit (A) is a constituent unit derived from a monomer (a) having at least one kind of a silicon atom-containing group selected from the group consisting of a group represented by the formula (I) above, a group represented by the formula (II) above, a group represented by the formula (III) above, and a group represented by the formula (IV) above. The constituent unit (B) is a constituent unit derived from a monomer (b) which is a (meth) acrylic acid ester represented by the formula (b). The constituent unit (C) is a constituent unit derived from a monomer (c) other than the monomer (a) and the monomer (b). The monomer (c) has a homopolymer solubility parameter SP of less than or equal to 9.5 and has no cyclic structure. The silicon atom-containing resin may include a constituent unit derived from a monomer other than the monomer (a), the monomer (b), and the monomer (c). An example of the constituent unit is a constituent unit (D) derived from a monomer (d) including a triorganosilyloxycarbonyl group.

(1-1) Silicon Atom-Containing Group

The silicon atom-containing group included in the monomer (a) is at least one kind selected from the group consisting of a group represented by the formula (I), a group represented by the formula (II), a group represented by the formula (III), and a group represented by the formula (IV).

In the formula (I), a and b each independently represent an integer of 2 to 5, m represents an integer of 0 to 50, and n represents an integer of 3 to 270. $R^1$ to $R^5$ each independently represent an alkyl group, an alkoxy group, a phenyl group, a substituted phenyl group, a phenoxy group, or a substituted phenoxy group.

In the formula (II), c and d each independently represent an integer of 2 to 5, and p represents an integer of 0 to 50. $R^6$, $R^7$, and $R^8$ each independently represent an alkyl group, $R^a$, or $R^b$.

In $R^a$, x represents an integer of 0 to 200. $R^{23}$ to $R^{27}$ are the same or different and each represent an alkyl group.

In $R^b$, y represents an integer of 1 to 200. $R^{28}$ to $R^{29}$ are the same or different and each represent an alkyl group.

In the formula (III), e, f, g, and h each independently represent an integer of 2 to 5, q and s each independently represent an integer of 0 to 50, and r represents an integer of 3 to 270. $R^9$ to $R^{12}$ each independently represent an alkyl group, an alkoxy group, a phenyl group, a substituted phenyl group, a phenoxy group, or a substituted phenoxy group.

In the formula (IV), i, j, k, and l each independently represent an integer of 2 to 5, t and u each independently represent an integer of 0 to 50, and v and w each independently represent an integer of 0 to 70. $R^{13}$ to $R^{22}$ are the same or different and each represent an alkyl group.

The silicon atom-containing resin may include two or more kinds of silicon atom-containing groups selected from the group consisting of a group represented by the formula (I), a group represented by the formula (II), a group represented by the formula (III), and a group represented by the formula (IV). In this case, the silicon atom-containing resin may include two or more kinds of groups represented by the formula (I), two or more kinds of groups represented by the formula (II), two or more kinds of groups represented by the formula (III), and/or two or more kinds of groups represented by the formula (IV).

One preferable example of the silicon atom-containing resin is a (meth)acrylic resin including a silicon atom-containing group. In the present description, "(meth)acrylic" refers to at least one of methacrylic and acrylic.

(1-2) Monomer (a)

The monomer (a) is preferably at least one kind selected from the group consisting of a monomer (a1) represented by the formula (I'), a monomer (a2) represented by the formula (II'), a monomer (a3) represented by the formula (III'), and a monomer (a4) represented by the formula (IV'). By polymerization of the monomer composition containing such a monomer (a), a silicon atom-containing resin that is a (meth)acrylic resin including a constituent unit (A) derived from the monomer (a) selected from the group consisting of the monomer (a1), the monomer (a2), the monomer (a3) and the monomer (a4) can be obtained. This silicon atom-containing resin includes at least one kind of silicon atom-containing group selected from the group consisting of a group represented by the formula (I), a group represented by the formula (II), a group represented by the formula (III), and a group represented by the formula (IV).

The silicon atom-containing resin may include two or more kinds of constituent units (A) derived from the monomer (a).

In the formula (I'), $R^{31}$ represents a hydrogen atom or a methyl group, and a, b, m, n and $R^1$ to $R^5$ represent the same meaning as previously mentioned.

In the formula (II'), $R^{32}$ represents a hydrogen atom or a methyl group, and c, d, p, and $R^6$ to $R^8$ represent the same meaning as previously mentioned.

In the formula (III'), $R^{33}$ and $R^{14}$ each independently represent a hydrogen atom or a methyl group, and e, f, g, h, q, r, s and $R^9$ to $R^{12}$ represent the same meaning as previously mentioned.

In the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned.

The monomer (a1) represented by the formula (I'), the monomer (a2) represented by the formula (II'), the monomer (a3) represented by the formula (III'), and the monomer (a4) represented by the formula (IV') are silicon atom-containing polymerizable monomers respectively including a group represented by the formula (I), a group represented by the formula (II), a group represented by the formula (III), and a group represented by the formula (IV).

The monomer (a) has a molecular weight of greater than 2500. The coating film formed from the coating composition containing the silicon atom-containing resin including the constituent unit (A) derived from the monomer (a) having such a high molecular weight can have excellent dynamic antifouling property on the premise that the content of the constituent unit (A) in the silicon atom-containing resin is in a predetermined range described later, the silicon atom-containing resin further includes the predetermined constituent unit (B) and constituent unit (C), and the content of the constituent unit (C) in the silicon atom-containing resin is in a predetermined range described later. The molecular weight of the monomer (a) may be a number average molecular weight. The number average molecular weight of the monomer (a) is a number average molecular weight in terms of polystyrene measured by gel permeation chromatography (GPC).

At least one factor for obtaining excellent dynamic antifouling property is presumed as follows. The silicon atom-containing resin includes a silicon-containing side chain having a high molecular weight, to cause an oil-like coating film to be formed on the surface of the coating film moving in water, whereby the effects of high smoothness of the surface of the coating film, high elasticity of the coating film, and low interface free energy between the coating film and water are increased. It is also presumed that when the silicon atom-containing resin further includes the hydrophilic constituent unit (B) derived from the monomer (b), a hydrophobic-hydrophilic domain-like structure in which minute scale hydrophilic domains are randomly distributed is formed on the surface of the coating film, so that the adhesion of organisms is easily suppressed.

The molecular weight of the monomer (a) is preferably greater than or equal to 3000, and more preferably greater than or equal to 4000 or greater than or equal to 5000, and may be greater than or equal to 10,000 from the viewpoint of further enhancing the dynamic antifouling property. The molecular weight of the monomer (a) is usually less than or equal to 20,000, preferably less than or equal to 18000, more preferably less than or equal to 15000, and still more preferably less than or equal to 12000. If the molecular weight of the monomer (a) is too high, the coating film formed from the coating composition is apt to be nonuniform in distribution of components due to the immiscibility between monomers in the monomer composition which is a mixture of monomers used for preparing the silicon atom-containing resin or the immiscibility between polymers generated by polymerization of the monomer composition. Consequently, the physical properties of the coating film may be deteriorated. One method of confirming whether a coating film is nonuniform in distribution of components is to prepare the coating film composed only of a silicon atom-containing resin and confirm whether the coating film is transparent. When the coating film is transparent, the coating film can be said to be uniform in distribution of components, and when the coating film is cloudy, the coating film can be said to be nonuniform in distribution of components.

However, the silicon atom-containing resin includes a predetermined amount of the constituent unit (C) derived from the monomer (c) described later, whereby even when the monomer (a) having a high molecular weight is used, a coating film being uniform in distribution of components can be easily obtained.

The monomer (a) may be a combination of two or more kinds of monomers belonging to the monomer (a). The two or more kinds of monomers may have molecular weights different from each other as long as they are greater than 2500.

The monomer (a1) is represented by the formula (I'). By using the monomer (a1) as the monomer (a), a silicon atom-containing resin that is a (meth)acrylic resin having a silicon atom-containing group represented by the formula (I) in the side chain is obtained.

The silicon atom-containing resin may include two or more kinds of constituent units derived from the monomer (a1).

In the formula (I') [the same applies to the formula (I)], a is preferably 2 or 3.

b is preferably 2 or 3.

m is preferably greater than or equal to 0 and less than or equal to 25, and more preferably greater than or equal to 0 and less than or equal to 20, from the viewpoint of water resistance, the adhesion to the substrate, and the like of the coating film. m may be greater than or equal to 3 or greater than or equal to 5, and less than or equal to 10 or less than or equal to 8.

n is usually greater than or equal to 3 and less than or equal to 270, preferably greater than or equal to 35 and less than or equal to 245, more preferably greater than or equal to 45 and less than or equal to 205, and still more preferably greater than or equal to 45 and less than or equal to 160, from the viewpoint of antifouling property of the coating film and solubility in common organic solvents.

Examples of a substituent of the substituted phenyl group and substituted phenoxy group in $R^1$ to $R^5$ include an alkyl group and a halogen atom.

$R^1$ to $R^5$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

As the monomer (a1), commercially available products may be used. Examples of commercially available products having a molecular weight of greater than 2500 include "FM-0721" (one-terminal methacryloyloxyalkyl-modified organopolysiloxane, molecular weight: 5000) and "FM-0725" (one-terminal methacryloyloxyalkyl-modified organopolysiloxane, molecular weight: 10,000) manufactured by JNC Corporation, and "KF-2012" (one-terminal methacryloyloxyalkyl-modified organopolysiloxane, molecular weight: 4600) and "X-22-2426" (one-terminal methacryloyloxyalkyl-modified organopolysiloxane, molecular weight: 12000) manufactured by Shin-Etsu Chemical Co., Ltd., all of which are trade names.

The monomer (a2) is represented by the formula (II'). By using the monomer (a2) as the monomer (a), a silicon atom-containing resin that is a (meth)acrylic resin having a silicon atom-containing group represented by the formula (II) in the side chain is obtained. As the monomer (a2), commercially available products may be used.

The silicon atom-containing resin may include two or more kinds of constituent units derived from the monomer (a2).

In the formula (II') [the same applies to the formula (II)], c is preferably 2 or 3.

d is preferably 2 or 3.

p is preferably greater than or equal to 0 and less than or equal to 25, and more preferably greater than or equal to 0 and less than or equal to 20, from the viewpoint of water resistance, the adhesion to the substrate, and the like of the coating film. p may be greater than or equal to 3 or greater than or equal to 5, and less than or equal to 10 or less than or equal to 8.

x is usually greater than or equal to 0 and less than or equal to 200, preferably greater than or equal to 10 and less than or equal to 150, and more preferably greater than or equal to 20 and less than or equal to 125, from the viewpoint of solubility in common organic solvents.

y is usually greater than or equal to 1 and less than or equal to 200, preferably greater than or equal to 10 and less than or equal to 150, and more preferably greater than or equal to 20 and less than or equal to 125, from the viewpoint of solubility in common organic solvents.

Alkyl groups in $R^6$ to $R^8$ and $R^{23}$ to $R^{29}$ are each preferably an alkyl group having 1 to 6 carbon atoms, more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and still more preferably a methyl group or an ethyl group.

It is preferable that all of $R^6$ to $R^8$ are alkyl groups.

The monomer (a3) is represented by the formula (III'). By using the monomer (a3) as the monomer (a), a silicon atom-containing resin that is a (meth)acrylic resin including a silicon atom-containing group represented by the formula (III) (this silicon atom-containing group is a cross-linking group crosslinking polymer main chains) is obtained.

The silicon atom-containing resin may include two or more kinds of constituent units derived from the monomer (a3).

In the formula (III') [the same applies to the formula (III)], e and h are each preferably 2 or 3.

f and g are each preferably 2 or 3.

q and s are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

r is usually greater than or equal to 3 and less than or equal to 270, preferably greater than or equal to 35 and less than or equal to 245, more preferably greater than or equal to 45 and less than or equal to 205, and still more preferably greater than or equal to 45 and less than or equal to 160, from the viewpoint of antifouling property of the coating film, solubility in common organic solvents, and the like.

Examples of a substituent of the substituted phenyl group and substituted phenoxy group in $R^9$ to $R^{12}$ include an alkyl group and a halogen atom.

$R^9$ to $R^{12}$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

As the monomer (a3), commercially available products may be used. Examples of commercially available products having a molecular weight of greater than 2500 include "FM-7721" (both-terminal methacryloyloxyalkyl-modified organopolysiloxane, molecular weight: 5000) and "FM-7725" (both-terminal methacryloyloxyalkyl-modified organopolysiloxane, molecular weight: 10,000) manufactured by JNC Corporation, and "X-22-164B" (both-terminal methacryloyloxyalkyl-modified organopolysiloxane, molecular weight: 3200), "X-22-164C" (both-terminal methacryloyloxyalkyl-modified organopolysiloxane, molecular weight: 4800), "X-22-164E" (both-terminal methacryloyloxyalkyl-modified organopolysiloxane, molecular weight: 7800), and "X-22-2445" (both-terminal acryloyloxyalkyl-modified organopolysiloxane, molecular weight: 3200) manufactured by Shin-Etsu Chemical Co., Ltd., all of which are trade names.

The monomer (a4) is represented by the formula (IV'). By using the monomer (a4) as the monomer (a), a silicon atom-containing resin that is a (meth)acrylic resin including a silicon atom-containing group represented by the formula (IV) (this silicon atom-containing group is a cross-linking group crosslinking polymer main chains.) is obtained. As the monomer (a4), commercially available products may be used.

The silicon atom-containing resin may include two or more kinds of constituent units derived from the monomer (a4).

In the formula (IV') [the same applies to the formula (IV)], i and l are each preferably 2 or 3.

j and k are each preferably 2 or 3.

t and u are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

v and w are each usually greater than or equal to 0 and less than or equal to 70, preferably greater than or equal to 5 and less than or equal to 60, and more preferably greater than or equal to 10 and less than or equal to 50, from the viewpoint of antifouling property of the coating film, solubility in common organic solvents, and the like.

Alkyl groups in $R^{13}$ to $R^{22}$ are each preferably an alkyl group having 1 to 6 carbon atoms, more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and still more preferably a methyl group or an ethyl group.

a to n, p to y and $R^1$ to $R^{29}$ are appropriately selected so that the molecular weight of the monomer (a) is greater than 2500 with reference to the above description.

The monomer (a) is preferably at least one kind selected from the group consisting of the monomer (a1) and the monomer (a3) from the viewpoint of enhancing the dynamic antifouling property and the viewpoint of easy availability of a commercial product. It is also preferable to use a combination of the monomer (a1) and the monomer (a3) as the monomer (a).

From the viewpoint of the dynamic antifouling property and static antifouling property (antifouling property when the antifouling coating film is left standing in water (sea water)), the content of the constituent unit (A) derived from the monomer (a) is greater than 20% by mass, preferably greater than or equal to 21% by mass, and more preferably greater than or equal to 25% by mass, and may be greater than or equal to 30% by mass, greater than or equal to 35% by mass, greater than or equal to 40% by mass, or greater than or equal to 50% by mass in all constituent units contained in the silicon atom-containing resin. When the content of the constituent unit (A) is greater than 20% by mass, the coating composition can exhibit sufficient dynamic antifouling property even when the antifouling agent is not separately contained in the coating composition. From the viewpoint of coating film physical properties and uniformity of the coating film described above, the content of the constituent unit (A) is preferably less than or equal to 90% by mass, more preferably less than or equal to 80% by mass, and still more preferably less than or equal to 70% by mass in all constituent units contained in the silicon atom-containing resin.

The silicon atom-containing resin may include a constituent unit (A') derived from a monomer (a') having at least one kind of silicon atom-containing group selected from the group consisting of a group represented by the formula (I), a group represented by the formula (II), a group represented by the formula (III), and a group represented by the formula (IV) and having a molecular weight of less than or equal to 2500. From the viewpoint of the dynamic antifouling property, the content of the constituent unit (A') is preferably less than or equal to 30% by mass, more preferably less than or equal to 20% by mass, still more preferably less than or equal to 10% by mass, yet still more preferably less than or equal to 5% by mass, and particularly preferably 0% by mass in all constituent units contained in the silicon atom-containing resin.

The ratio of the content of the constituent unit (A') to the total content of the constituent unit (A) and the constituent unit (A') is preferably less than or equal to 0.7, more preferably less than or equal to 0.5, still more preferably less than or equal to 0.4, still more preferably less than or equal to 0.2, and particularly preferably 0 from the viewpoint of the dynamic antifouling property.

(1-3) Monomer (b)

The constituent unit (b) is a monomer which is a (meth) acrylic acid ester represented by the formula (b). When the silicon atom-containing resin further includes the constituent unit (B) derived from the monomer (b), the dynamic antifouling property can be improved, and the static antifouling property can also be advantageously improved. Furthermore, by further containing the constituent unit (B), the coating film formed from the coating composition can have excellent softening resistance. Furthermore, by further containing the constituent unit (B) derived from the monomer (b) and the constituent unit (E) derived from the monomer (e) described later, a coating film consumption rate can be moderately increased.

In the formula (b), $R^A$ represents a hydrogen atom or a methyl group. $R^B$ represents a monovalent group including one or more kinds selected from the group consisting of a hydroxyl group, a carboxy group, and an oxyalkylene chain. The silicon atom-containing resin may include two or more kinds of constituent units derived from the monomer (b). The monomer (b) may be a monomer including two or more kinds of groups selected from the group consisting of a hydroxyl group, a carboxy group, and an oxyalkylene chain.

From the viewpoint of enhancing the dynamic antifouling property, the static antifouling property, and the softening resistance, $R^B$ of the monomer (b) preferably contains at least an oxyalkylene chain. An alkylene group included in the oxyalkylene chain may be linear or branched, and the number of carbon atoms of the alkylene group is, for example, greater than or equal to 1 and less than or equal to 24, preferably greater than or equal to 1 and less than or equal to 13, and more preferably greater than or equal to 1 and less than or equal to 6, and still more preferably 2 or 3. Examples of the alkylene group include —$CH_2$—, —$(CH_2)_2$—, —$(CH_2)_3$—, —$CH(CH_3)CH_2$—, and —$CH_2CH(CH_3)$—.

From the viewpoint of enhancing the dynamic antifouling property and the static antifouling property, the homopolymer solubility parameter SP (solubility parameter SP of a homopolymer of the monomer (b). hereinafter, also simply referred to as "SP") of the monomer (b) is preferably greater than or equal to 10.0, more preferably greater than or equal to 10.5, and still more preferably greater than or equal to 11.0. The homopolymer SP of the monomer (b) is usually less than or equal to 25, and preferably less than or equal to 15. The SP will be described in detail later.

Examples of the monomer (b) include hydroxyl group-containing (meth)acrylic acid alkyl esters including an ester moiety of 1 or more and 20 or less carbon atoms, such as 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, and 4-hydroxybutyl (meth)acrylate; carboxy group-containing (meth)acrylic acid alkyl esters including an ester moiety of 1 or more and 20 or less carbon atoms; alkoxyalkyl (meth) acrylates including an ester moiety of 1 or more and 20 or less carbon atoms, such as methoxyethyl (meth)acrylate; (meth)acrylic acid esters including an ester moiety containing a polyalkylene glycol chain, such as methoxy polyethylene glycol (meth)acrylate [the number of repetitions of —$OC_2H_4$— is, for example, 1 to 50, preferably 1 to 24, more preferably 2 to 14, still more preferably 2 to 9] and methoxy polypropylene glycol (meth)acrylate [the number of repetitions of —$OC_3H_6$— is, for example, 1 to 50, preferably 1 to 24, more preferably 2 to 14, still more preferably 2 to 9]; and (meth)acrylic acid esters including an ester moiety containing a polyalkylene glycol chain and a carboxy group, such as (meth)acryloyloxyethylsuccinic acid, (meth)acryloyloxyethylphthalic acid, (meth)acryloyloxyethylhexahydrophthalic acid, (meth)acryloyloxypropylphthalic acid, and (meth)acryloyloxypropylhexahydrophthalic acid.

Among the above, the monomer (b) is preferably a (meth)acrylic acid alkoxyalkyl including an ester moiety having 1 or more and 20 or less carbon atoms, a (meth)acrylic acid ester including an ester moiety containing a polyalkylene glycol chain, and/or a (meth)acrylic acid ester including an ester moiety containing a polyalkylene glycol chain and a carboxy group.

From the viewpoint of the dynamic antifouling property and the static antifouling property, the content of the constituent unit (B) derived from the monomer (b) is preferably greater than or equal to 1% by mass and less than or equal to 30% by mass, more preferably greater than or equal to 3% by mass and less than or equal to 30% by mass, and still more preferably greater than or equal to 5% by mass and less than or equal to 30% by mass, and may be less than or equal to 25% by mass, less than or equal to 20% by mass, less than or equal to 15% by mass, or less than or equal to 10% by mass in all constituent units contained in the silicon atom-containing resin. From the viewpoint of enhancing the softening resistance, the content of the constituent unit (B) is preferably less than or equal to 30% by mass, more preferably less than or equal to 20% by mass, and still more preferably less than or equal to 15% by mass in all constituent units contained in the silicon atom-containing resin.

(1-4) Monomer (c)

The monomer (c) is a monomer other than the monomer (a) and the monomer (b), has a homopolymer solubility parameter SP (solubility parameter SP of a homopolymer of the monomer (c)) of less than or equal to 9.5, and has no cyclic structure. When the silicon atom-containing resin further includes the constituent unit (C) derived from the monomer (c), the dynamic antifouling property can be improved, and the static antifouling property can also be advantageously improved. The silicon atom-containing resin may include two or more kinds of constituent units (C) derived from the monomer (c).

At least one factor that the dynamic antifouling property can be improved by further including the constituent unit (C) is presumed as follow. The compatibility between the monomers in the monomer composition used for preparing the silicon atom-containing resin is improved by using the monomer (c) having a small homopolymer SP in combination, whereby the random copolymerizability with the monomer (a) contributing to the dynamic antifouling property is improved during polymerization of the monomer composition. The homopolymer SP of the monomer (c) is usually greater than or equal to 7.0, preferably greater than or equal to 8.0, and more preferably greater than or equal to 9.0.

From the viewpoint of enhancing the dynamic antifouling property, the monomer (c) is a monomer having no cyclic structure. The monomer (c) having no cyclic structure has lower hydrophobicity than that of the monomer having a cyclic structure, whereby in a coating film formed from a coating composition from a monomer composition containing the monomer, the constituent unit (C) derived from the monomer tends to be less likely to be localized on the surface of the coating film. Therefore, it is considered that the use of the monomer (c) having no cyclic structure can make it easy to localize the constituent unit (A) derived from the hydrophobic monomer (a) on the surface of the coating film as compared with the case of using the monomer having a cyclic structure, and as a result, the dynamic antifouling property is easily improved.

In the present description, the solubility parameter SP of the homopolymer can be measured by the following method (Reference: SUH, CLARKE, J.P.S.A-1, 5, 1671 to 1681 (1967)).

At a measurement temperature of 20° C., 0.5 g of a homopolymer is weighed in a 100 mL beaker, and 10 mL of a good solvent (acetone) is added using a whole pipette and dissolved with a magnetic stirrer to prepare a diluted solution. Next, a low-SP poor solvent (n-hexane) is gradually added dropwise to the diluted solution using a 50 mL burette, and the point at which turbidity occurs in the diluted solution is defined as a dropping amount of the low-SP poor solvent. Separately, a high-SP poor solvent (ion-exchanged water) is gradually added dropwise to the diluted solution, and the point at which turbidity occurs in the diluted solution is defined as a dropping amount of the high-SP poor solvent. The SP value can be calculated from the dropping amount of each of the poor solvents until the turbidity point is reached, by a publicly known calculation method described in the above reference and the like. The monomer (c) is preferably a (meth)acrylic monomer, more preferably a (meth)acrylic acid ester, and still more preferably a (meth)acrylic acid alkyl ester. The (meth)acrylic acid alkyl ester as the monomer (c) is preferably represented by the following formula:

$$CH_2=C(R^C)(COOR^D).$$

In the above formula, $R^C$ is a hydrogen atom or a methyl group, and $R^D$ is a chain alkyl group having 3 or more carbon atoms. The chain alkyl group may be linear or branched. The number of carbon atoms in $R^D$ is usually less than or equal to 20, and preferably less than or equal to 12.

Specific examples of the monomer (c) include n-butyl acrylate (SP: 9.5), n-butyl methacrylate (SP: 9.3), iso-butyl acrylate (SP: 9.5), iso-butyl methacrylate (SP: 9.3), tert-butyl methacrylate (SP: 9.4), 2-ethylhexyl acrylate (SP: 8.4), 2-ethylhexyl methacrylate (SP: 8.3), lauryl methacrylate (SP: 7.8), stearyl methacrylate, and isostearyl methacrylate. Among these, a monomer in which the SP of a homopolymer is greater than or equal to 9.0 is preferable, and n-butyl acrylate, n-butyl methacrylate, tert-butyl methacrylate, and the like are more preferable.

From the viewpoint of the dynamic antifouling property and the static antifouling property, the content of the constituent unit (C) derived from the monomer (c) is greater than 2% by mass in all constituent units contained in the silicon atom-containing resin. From the viewpoint of the dynamic antifouling property and the static antifouling property, the content of the constituent unit (C) is preferably greater than or equal to 3% by mass and less than or equal to 60% by mass, more preferably greater than or equal to 5% by mass and less than or equal to 50% by mass, still more preferably greater than or equal to 8% by mass and less than or equal to 45% by mass, and yet still more preferably greater than or equal to 10% by mass and less than or equal to 40% by mass in all constituent units contained in the silicon atom-containing resin.

(1-5) Monomer (d)

The silicon atom-containing resin may include the constituent unit (D) derived from the monomer (d). The constituent unit (d) is a monomer including a triorganosilyloxycarbonyl group. When the silicon atom-containing resin further includes the constituent unit (D) derived from the monomer (d), the dynamic antifouling property can be improved, and the static antifouling property can also be advantageously improved.

The monomer (d) is preferably a monomer (d1) represented by the formula (VII'). By polymerization of the monomer composition containing the monomer (d1), a silicon atom-containing resin that is a (meth)acrylic resin including a constituent unit (D) derived from the monomer (d1) is obtained. The silicon atom-containing resin includes —C(=O)—O—SiR$^{40}$R$^{41}$R$^{42}$ as a triorganosilyloxycarbonyl group.

The silicon atom-containing resin may include two or more kinds of constituent units (D) derived from the monomer (d). For example, the silicon atom-containing resin may include two or more kinds of constituent units (D) including different triorganosilyloxycarbonyl groups.

In the formula (VII'), R$^{40}$, R$^{41}$ and R$^{42}$ are the same or different and each represent a hydrocarbon residue having 1 to 20 carbon atoms (monovalent hydrocarbon group). Examples of the hydrocarbon residue having 1 to 20 carbon atoms include a linear or branched alkyl group having 20 or less carbon atoms such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, a nonyl group, a decyl group, an undecyl group, a dodecyl group, a tridecyl group, or a tetradecyl group; a cyclic alkyl group that may have a substituent such as a cyclohexyl group or a substituted cyclohexyl group; and an aryl group that may have a substituent such as an aryl group or a substituted aryl group.

Examples of the cyclic alkyl group that has a substituent include a cyclic alkyl group substituted with a halogen, an alkyl group having up to about 18 carbon atoms, an acyl group, a nitro group, or an amino group. Examples of the aryl group that has a substituent include an aryl group substituted with a halogen, an alkyl group having up to about 18 carbon atoms, an acyl group, a nitro group, or an amino group.

Among these, it is preferable that one or more of R$^{40}$, R$^{41}$ and R$^{42}$ is an iso-propyl group, and it is more preferable that all of R$^{4}$, R$^{41}$ and R$^{42}$ are iso-propyl groups since the dynamic antifouling property and the static antifouling property tend to be able to be stably maintained for a long period of time.

In the case where the silicon atom-containing resin includes the constituent unit (D), from the viewpoint of the dynamic antifouling property and the static antifouling property, the content of the constituent unit (D) derived from the monomer (d) is preferably greater than or equal to 2% by mass and less than or equal to 50% by mass, more preferably greater than or equal to 5% by mass and less than or equal to 40% by mass, and still more preferably greater than or equal to 10% by mass and less than or equal to 35% by mass in all constituent units contained in the silicon atom-containing resin.

(1-6) Monomer (e)

The silicon atom-containing resin may further include a constituent unit (E) derived from a monomer (e) including at least one kind of metal atom-containing group selected from the group consisting of a group represented by the formula (V) and a group represented by the formula (VI). When the silicon atom-containing resin further includes the constituent unit (E), the dynamic antifouling property can be improved, and the static antifouling property can also be advantageously improved.

The silicon atom-containing resin may include both a group represented by the formula (V) and a group represented by the formula (VI).

The monomer (e) is preferably at least one kind selected from the group consisting of a monomer (e1) represented by the formula (V) and a monomer (e2) represented by the formula (VI'). By polymerization of the monomer composition containing such a monomer (e), a silicon atom-containing resin that is a (meth)acrylic resin including a constituent unit (E) derived from the monomer (e) selected from the group consisting of the monomer (e1) and the monomer (e2) is obtained. This silicon atom-containing resin includes at least one kind of metal atom-containing group selected from the group consisting of a group represented by the formula (V) and a group represented by the formula (VI).

The silicon atom-containing resin may include two or more kinds of constituent units (E) derived from the monomer (e).

The divalent metal atom M in the formula (V') [the same applies to formula (V)] and the formula (VI') [the same applies to formula (VI)] is, for example, Mg, Zn, or Cu, and is preferably Zn or Cu.

In the formula (V') [the same applies to formula (V)], R$^{30}$ is preferably an organic acid residue.

The monomer (e1) is represented by the formula (V'). By using the monomer (e1) as the monomer (e), a silicon atom-containing resin that is a (meth)acrylic resin further including a metal atom-containing group represented by the formula (V) is obtained.

In R$^{30}$, as an organic acid forming an organic acid residue, for example, monobasic organic acids such as acetic acid, monochloroacetic acid, monofluoroacetic acid, propionic acid, caproic acid, caprylic acid, 2-ethylhexyl acid, capric acid, versatic acid, isostearic acid, palmitic acid, cresotinic acid, oleic acid, elaidic acid, linoleic acid, linolenic acid, stearolic acid, ricinoleic acid, ricinoelaidic acid, brassidic acid, erucic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalenecarboxylic acid, and pyruvic acid are recited.

Particularly, it is preferable that the organic acid residue is a fatty acid organic acid residue because a coating film without cracking and peeling tends to be kept for a long period of time. In particular, zinc oleate (meth)acrylate or zinc versatate (meth)acrylate having high flexibility is preferably used as the monomer (e1).

As other preferred organic acids, monobasic cyclic organic acids other than aromatic organic acids can be recited. Examples of the monobasic cyclic organic acids include: organic acids including a cycloalkyl group, such as naphthenic acid; resin acids, such as tricyclic resin acids; and salts thereof.

Examples of the tricyclic resin acids include monobasic acids including a diterpene hydrocarbon skeleton. Examples of the monobasic acids including a diterpene hydrocarbon skeleton include compounds including an abietane, pimarane, isopimarane, or labdane skeleton. More specifically, examples thereof include abietic acid, neoabietic acid, dehydroabietic acid, hydrogenated abietic acid, parastrinic acid, pimaric acid, isopimaric acid, levopimaric acid, dextropimaric acid, sandaracopimaric acid, and salts thereof. Among these, abietic acid, hydrogenated abietic acid, and salts thereof are preferable from the viewpoint of dynamic antifouling property or the like of the coating film.

As the monobasic cyclic organic acid, for example, pine resin, resin acid of pine and the like may be used. Examples of such things include rosins, hydrogenated rosins, disproportionated rosins, and naphthenic acid. The rosins include gum rosin, wood rosin, tall oil rosin, and the like. The rosins, the hydrogenated rosins, and the disproportionated rosins are preferable from the viewpoints of being inexpensive and easily available, being excellent in handleability, and easily improving dynamic antifouling property and static antifouling property.

The acid value of the monobasic cyclic organic acid is preferably greater than or equal to 100 mgKOH/g and less than or equal to 220 mgKOH/g, more preferably greater than or equal to 120 mgKOH/g and less than or equal to 190 mgKOH/g, and still more preferably greater than or equal to 140 mgKOH/g and less than or equal to 185 mgKOH/g.

When a monobasic cyclic organic acid having an acid value within the above range is used as the monobasic cyclic organic acid forming $R^{30}$, good dynamic antifouling property and static antifouling property of the coating film tend to be able to be maintained for a longer period of time.

An organic acid residue of the monomer (e1) may be formed of only one kind of organic acid or two or more kinds of organic acids.

Examples of a production method of the monomer (e1) including an organic acid residue as $R^{30}$ include a method of reacting an inorganic metal compound, with a carboxyl group-containing radical polymerizable monomer such as (meth)acrylic acid, and a nonpolymerizable organic acid (an organic acid forming the organic acid residue) in an organic solvent containing an alcoholic compound.

The constituent unit (E) derived from the monomer (e1) may also be formed by a method of reacting a resin obtainable by polymerization of a monomer composition including a carboxyl group-containing radical polymerizable monomer such as (meth)acrylic acid, with a metal compound, and a nonpolymerizable organic acid (an organic acid forming the organic acid residue).

The monomer (e2) is represented by the formula (VI'). By using the monomer (e2) as the monomer (e), a silicon atom-containing resin that is a (meth)acrylic resin further including a metal atom-containing group represented by the formula (VI) (this metal atom-containing group is a crosslinking group crosslinking polymer main chains) is obtained.

Examples of the monomer (e2) include magnesium acrylate [$(CH_2=CHCOO)_2Mg$], magnesium methacrylate [$(CH_2=C(CH_3)COO)_2Mg$], zinc acrylate [$(CH_2=CHCOO)_2Zn$], zinc methacrylate [$(CH_2=C(CH_3)COO)_2Zn$], copper acrylate [$(CH_2=CHCOO)_2Cu$], and copper methacrylate [$(CH_2=C(CH_3)COO)_2Cu$]. One or two or more of these can be appropriately selected and used as necessary.

Examples of a production method of the monomer (e2) include a method of reacting a polymerizable unsaturated organic acid such as (meth)acrylic acid with a metal compound in an organic solvent containing an alcoholic compound together with water. In this case, the content of water in the reactants is preferably adjusted to greater than or equal to 0.01% by mass and less than or equal to 30% by mass.

The silicon atom-containing resin may include both of a constituent unit derived from the monomer (e1) and a constituent unit derived from the monomer (e2).

In the case where the silicon atom-containing resin includes the constituent unit (E), from the viewpoint of the dynamic antifouling property and the static antifouling property and the like, the content of the constituent unit (E) is preferably greater than or equal to 2% by mass and less than or equal to 30% by mass, more preferably greater than or equal to 4% by mass and less than or equal to 25% by mass, and still more preferably greater than or equal to 6% by mass and less than or equal to 20% by mass in all constituent units contained in the silicon atom-containing resin.

(1-7) Other Monomer

The silicon atom-containing resin may include a constituent unit (F) derived from a monomer (f) other than the above. The silicon atom-containing resin may include two or more kinds of constituent units (F).

The monomer (f) is not particularly limited as long as it is an unsaturated monomer copolymerizable with the monomers (a) to (e), and examples thereof include (meth)acrylic acid esters not belonging to the monomers (b) and (c). Specific examples of the monomer (e) include methyl (meth)acrylate, ethyl (meth)acrylate, n-propyl (meth)acrylate, isopropyl (meth)acrylate, cyclohexyl (meth)acrylate, phenyl (meth)acrylate, benzyl (meth)acrylate, isobornyl (meth)acrylate, and glycidyl (meth)acrylate. Among these, the monomer (f) preferably contains at least methyl methacrylate.

In the case where the silicon atom-containing resin includes the constituent unit (F), the content of the constituent unit (F) is usually greater than or equal to 0.1% by mass and less than 78% by mass, preferably greater than or equal to 5% by mass and less than or equal to 75% by mass, more preferably greater than or equal to 10% by mass and less than or equal to 70% by mass, and still more preferably greater than or equal to 10% by mass and less than or equal to 60% by mass in all constituent units contained in the silicon atom-containing resin. When the content of the constituent unit (F) is greater than or equal to 0.1% by mass, it is possible to balance various properties of the resulting coating composition and coating film. When the content of the constituent unit (F) is less than 78% by mass, the coating composition can exhibit sufficient dynamic antifouling property even when an antifouling agent is not separately contained in the coating composition.

(1-8) Method of Producing Silicon Atom-Containing Resin

The production method of the silicon atom-containing resin is not particularly limited, and for example, a method of reacting a monomer composition of the aforementioned monomers in the presence of a radical initiator at a reaction temperature of 60 to 180° C. for 5 to 14 hours. Conditions of the polymerization reaction may be appropriately adjusted.

As the radical initiator, for example, 2,2-azobisisobutyronitrile, 2,2-azobis(2,4-dimethylvaleronitrile), 2,2-azobis (2-methylbutyronitrile), benzoyl peroxide, cumene hydroperoxide, lauryl peroxide, di-tert-butylperoxide, tert-butylperoxy-2-ethylhexanoate and the like are recited.

Examples of a polymerization method include a solution polymerization method, an emulsion polymerization method, and a suspension polymerization method that are carried out in an organic solvent. From the viewpoint of production efficiency and the like of the silicon atom-containing resin, the solution polymerization method is preferable. Examples of the organic solvent include common organic solvents such as toluene, xylene, methyl isobutyl ketone, and n-butyl acetate.

The number average molecular weight of the silicon atom-containing resin is usually greater than or equal to 2600 and less than or equal to 100000, preferably greater than or equal to 3000 and less than or equal to 50000, and more preferably greater than or equal to 5000 and less than or equal to 30000. When the number average molecular weight of the silicon atom-containing resin is greater than or equal to 2600, the coating film formed from the coating composition tends to be able to develop dynamic antifouling property. When the number average molecular weight of the silicon atom-containing resin is less than or equal to 100000, there is a tendency that the silicon atom-containing resin is likely to be uniformly dispersed in the coating composition. The number average molecular weight of the silicon atom-containing resin is a number average molecular weight in terms of polystyrene measured by gel permeation chromatography (GPC).

(1-9) Content of Silicon Atom-Containing Resin

The content of the silicon atom-containing resin in the coating composition is preferably greater than or equal to 25% by mass and less than or equal to 99% by mass, more preferably greater than or equal to 30% by mass and less than or equal to 90% by mass, and still more preferably greater than or equal to 35% by mass and less than or equal to 85% by mass, and may be less than or equal to 80% by mass, less than or equal to 70% by mass, or less than or equal to 60% by mass, in the solid content contained the coating composition. When the content of the silicon atom-containing resin is less than 25% by mass, the dynamic antifouling property, the static antifouling property, and the adhesion of the coating film to the substrate tend to decrease. The solid content contained in a coating composition refers to the sum of the ingredients other than a solvent contained in the coating composition.

(2) Other Ingredients that May be Contained in Coating Composition

The coating composition can contain one or two or more kinds of other ingredients than the silicon atom-containing resin. Examples of the other ingredients include additives such as a defoaming agent, an anti-sagging agent, a plasticizer, an antifouling agent, a water binder, a color separation inhibitor, an anti-settling agent, a coating film exhaustion conditioner, a UV absorber, a surface conditioner, a viscosity conditioner, a leveling agent, and a pigment disperser, pigments, and solvents. These additives, pigments, and solvents may be used singly or in combination of two or more kinds thereof.

A defoaming agent is an agent having a function of making the surface of foam to be formed nonuniform and suppressing the formation of foam, or an agent having a function of locally thinning the surface of formed foam and breaking the foam. It has been found that the coating composition contains the defoaming agent together with the silicon atom-containing resin to make it possible to further improve the dynamic antifouling property. Therefore, the coating composition preferably contains the defoaming agent.

Examples of the defoaming agent include silicon-based defoaming agents and non-silicon-based defoaming agents. The silicon-based defoaming agent is a defoaming agent containing a polysiloxane having surface activity or a modified product thereof, and the non-silicon-based defoaming agent is a defoaming agent other than a silicon-based defoaming agent (defoaming agent not containing polysiloxane or a modified product thereof). The silicon-based defoaming agent may be a fluorine-modified silicon-based defoaming agent. The fluorine-modified silicon-based defoaming agent is a defoaming agent containing a fluorine-modified polysiloxane.

Examples of the non-silicon-based defoaming agent include higher alcohol-based, higher alcohol derivative-based, fatty acid-based, fatty acid derivative-based, paraffin-based, (meth)acrylic polymer-based, and mineral oil-based defoaming agents. Examples of the silicon-based defoaming agent include types such as oil types, compound types, self-emulsifying types, and emulsion types.

As a defoaming agent, a commercially available product may be used. Examples of commercially available non-silicon-based defoaming agents include mineral oil-based defoaming agents such as "BYK-030" manufactured by BYK; "Disparlon OX68" manufactured by Kusumoto Chemicals Ltd., and "BYK-1790" manufactured by BYK. Examples of commercially available silicon-based defoaming agents other than fluorine-modified silicon-based defoaming agents include silicone oil-based defoaming agents such as "KF-96" manufactured by Shin-Etsu Chemical Co., Ltd., and "BYK-081" manufactured by BYK. Examples of commercially available fluorine-modified silicon-based defoaming agents include fluorosilicone oil-based defoaming agents such as "BYK-063", "BYK-065", and "BYK-066N" manufactured by BYK, and "FA-630" manufactured by Shin-Etsu Chemical Co., Ltd.

The content of the defoaming agent is greater than or equal to 0.002 parts by mass and less than or equal to 0.60 parts by mass, more preferably greater than or equal to 0.004 parts by mass and less than or equal to 0.55 parts by mass, still more preferably greater than or equal to 0.01 parts by mass and less than or equal to 0.40 parts by mass, and yet still more preferably greater than or equal to 0.01 parts by mass and less than or equal to 0.20 parts by mass, with respect to 100 parts by mass of the silicon atom-containing resin, from the viewpoint of improving the dynamic antifouling property and the defoaming property.

The anti-sagging agent is an agent having a function of suppressing the occurrence of sagging of the coating composition that may occur during a time from the application of the coating composition to an object to be coated until the completion of drying of the coating film. It has been found that the coating composition contains the anti-sagging agent together with the silicon atom-containing resin to make it possible to further improve the dynamic antifouling property. Therefore, the coating composition preferably contains the anti-sagging agent.

Examples of the anti-sagging agent include an amide-based anti-sagging agent; bentonite-based anti-sagging agent; polyethylene wax such as oxidized polyethylene wax; hydrogenated castor oil wax; a long chain fatty acid ester-based polymer; polycarboxylic acid; a silica fine particle-based anti-sagging agent; and a mixture of two or more kinds thereof.

Examples of the amide-based anti-sagging agent include amide wax-based anti-sagging agents such as fatty acid amide wax and polyamide wax. Examples of the fatty acid amide wax include stearic acid amide wax and oleic acid amide wax.

As the anti-sagging agent, a commercially available product may be used. Examples of the commercially available product of the amide wax-based anti-sagging agent include "Tarene 7200-20" manufactured by Kyoeisha Chemical Co., Ltd., and "Disparlon 6900-20X" and "Disparlon RE-8000" manufactured by Kusumoto Chemicals, Ltd., and "Monoral 3300" manufactured by HS CHEM. Examples of other commercially available products of the anti-sagging agent include organic bentonite-based anti-sagging agents such as "Bentone 38" manufactured by Elementis Japan KK and "TIXOGEL" manufactured by BYK.

The content of the anti-sagging agent is greater than or equal to 0.1 parts by mass and less than or equal to 6.0 parts by mass, more preferably greater than or equal to 0.2 parts by mass and less than or equal to 5.0 parts by mass, still more preferably greater than or equal to 0.25 parts by mass and less than or equal to 4.0 parts by mass, and yet still more preferably greater than or equal to 0.25 parts by mass and less than or equal to 3.0 parts by mass, with respect to 100 parts by mass of the silicon atom-containing resin, from the viewpoint of improving the dynamic antifouling property and the defoaming property.

The coating composition may contain a plasticizer. By adding the plasticizer, the crack resistance of the coating film can be improved. The addition of the plasticizer makes it possible to control the polishing rate (polishing speed) of the coating film to an appropriate speed, whereby it can be advantageous also in terms of the dynamic antifouling property and the static antifouling property.

Examples of the plasticizer include chlorinated paraffin; chlorinated polyolefins such as chlorinated rubber, chlorinated polyethylene, and chlorinated polypropylene; polyvinyl ether; polypropylene sebacate; partially hydrogenated terphenyl; polyvinyl acetate; poly (meth)acrylic acid alkyl esters such as a methyl (meth)acrylate copolymer, an ethyl (meth)acrylate copolymer, a propyl (meth)acrylate copolymer, a butyl (meth)acrylate copolymer, and a cyclohexyl (meth)acrylate copolymer; polyether polyol; alkyd resins; polyester resins; vinyl chloride-based resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, and a vinyl chloride-ethyl vinyl ether copolymer; silicone oils; oil and fat, and purified products thereof (wax, castor oil, and the like); petrolatum; liquid paraffin; rosin, hydrogenated rosin, naphthenic acid, fatty acid, and divalent metal salts thereof; phthalate esters such as dioctyl phthalate (DOP), dimethyl phthalate, dicyclohexyl phthalate, and diisodecyl phthalate (DIDP); aliphatic dibasic acid esters such as isobutyl adipate and dibutyl sebacate; glycol esters such as diethylene glycol dibenzoate and pentaerythritol alkyl ester; phosphoric acid esters such as tricresyl phosphoric acid (tricresyl phosphate), triaryl phosphoric acid (triaryl phosphate), and trichloroethyl phosphoric acid; epoxy compounds such as epoxy soybean oil and octyl epoxystearate; organotin compounds such as dioctyltin laurate and dibutyltin laurate; and trioctyl trimellitic acid, and triacetylene.

Among them, chlorinated paraffin, polyvinyl ether, polyether polyol, rosin, a vinyl chloride-isobutyl vinyl ether copolymer, phthalic acid ester, and phosphoric acid ester are preferable from the viewpoint of compatibility with the silicon atom-containing resin and crack resistance of the coating film.

The content of the plasticizer in the coating composition is preferably greater than or equal to 3 parts by mass and less than or equal to 100 parts by mass, more preferably greater than or equal to 5 parts by mass and less than or equal to 50 parts by mass, and still preferably greater than or equal to 5 parts by mass and less than or equal to 40 parts by mass, with respect to 100 parts by mass of the silicon atom-containing resin. When the content of the plasticizer is less than 3 parts by mass with respect to 100 parts by mass of the silicon atom-containing resin, there is a tendency that an effect of improving the crack resistance by addition of the plasticizer is not recognized, and there is also a tendency that an effect of improving the dynamic antifouling property and the static antifouling property by addition of the plasticizer is not recognized. When the content of the plasticizer exceeds 100 parts by mass with respect to 100 parts by mass of the silicon atom-containing resin, there is a tendency that the adhesion of the coating film to the substrate deteriorates or the dynamic antifouling property of the coating film deteriorates.

Since the coating film formed from the coating composition of the present invention can exhibit good dynamic antifouling property and good static antifouling property due to the antifouling effect based on the silicon atom-containing resin, the coating film is not necessarily required to contain an antifouling agent separately from the silicon atom-containing resin. However, in order to further enhance the antifouling property or to further enhance the long-term sustainability of the antifouling property, an antifouling agent may be contained in the coating composition as necessary. As the antifouling agent, those known in the art may be used without particular limitation, and for example, inorganic compounds, organic compounds containing a metal, and organic compounds not containing a metal can be recited.

Examples of the antifouling agent include metal salts such as zinc oxide; cuprous oxide; manganese ethylene-bis-dithiocarbamate; zinc dimethyldithiocarbamate; 2-methylthio-4-tert-butylamino-6-cyclopropylamino-s-triazine; 2,4,5,6-tetrachloroisophthalonitrile; N,N-dimethyldichlorophenyl urea; zinc ethylene-bis-dithiocarbamate; rhodan copper (cuprous thiocyanate); 4,5-dichloro-2-n-octyl-4-isothiazoline-3-one (4,5,-dichloro-2-n-octyl-3(2H)isothiazolone); N-(fluorodichloromethylthio)phthalimide; N,N'-dimethyl-N'-phenyl-(N-fluorodichloromethylthio)sulfamide; 2-pyridinethiol-1-oxide zinc salt (zinc pyrithione) and copper salt (copper pyrithione); tetramethylthiuram disulfide; 2,4,6-trichlorophenyl maleimide; 2,3,5,6-tetrachloro-4-(methylsulfonyl)pyridine; 3-iodo-2-propylbutyl carbamate; diiodomethyl-para-trisulfone; phenyl(bispyridyl)bismuth dichloride; 2-(4-thiazolyl)-benzimidazole; triphenylboronpyridine salt; stearylamine-triphenylboron; laurylamine-triphenylboron; bis dimethyl dithiocarbamoyl zinc ethylenebisdithiocarbamate; 1,1-dichloro-N-[(dimethylamino)sulfonyl]-1-fluoro-N-phenylmethanesulfenamide; 1,1-dichloro-N-[(dimethylamino)sulfonyl]-1-fluoro-N-(4-methylphenyl)methanesulfeneamide; N'-(3,4-dichlorophenyl)-N,N'-dimethyl urea; N'-tert-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile; 4-[1-(2,3-dimethylphenyl)ethyl]-1H-imidazole (general name: medetomidine).

The content of the antifouling agent in the coating composition is preferably less than or equal to 30 parts by mass, more preferably less than or equal to 20 parts by mass, still more preferably less than or equal to 10 parts by mass, and particularly preferably 0 part by mass with respect to 100 parts by mass of the silicon atom-containing resin.

As the pigment, for example, extender pigments such as sedimentary barium, talc, clay, chalk, silica white, alumina white, bentonite, calcium carbonate, magnesium carbonate, silicic acid, silicates, aluminum oxide hydrates and calcium sulfate; and coloring pigments such as titanium oxide, zircon oxide, basic lead sulfate, tin oxide, carbon black, white lead, graphite, zinc sulfide, zinc oxide, chromic oxide, yellow nickel titanium, yellow chromium titanium, yellow iron oxide, red iron oxide (rouge), black iron oxide, azoic red and yellow pigment, chromium yellow, phthalocyanine green, phthalocyanine blue, ultramarine blue and quinacridone can be recited.

As the solvent, for example, hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether and butyl cellosolve; esters such as butyl acetate, propyl acetate, benzyl acetate, ethylene glycol monomethyl ether acetate and ethylene glycol monoethyl ether acetate; ketones such as ethylisobutyl ketone and methylisobutyl ketone; alcohols such as n-butanol and propyl alcohol; and the like can be recited.

(3) Preparation of Coating Composition

The coating composition can be prepared, for example, by adding, to the silicon atom-containing resin or a resin composition containing the same (for example, a solution or dispersion containing the silicon atom-containing resin), as necessary, other ingredients, and mixing them by using a mixer such as a ball mill, a pebble mill, a roll mill, a sand grind mill, or a high speed disperser.

<Coating Film and Composite Coating Film>

The coating film according to the present invention (hereinafter, also simply referred to as "coating film") is a coating film formed from the coating composition according to the present invention. The coating film is an antifouling coating film having antifouling performance. Since the antifouling film is formed from the coating composition according to the present invention, the antifouling film can exhibit good dynamic antifouling property.

The coating film can be formed by applying the coating composition on a surface of an object to be coated according to a routine method, and then removing a solvent by volatilization at room temperature or under heating as necessary. Examples of an application method of the coating composition include conventionally known methods such as immersion method, spray method, brush coating, roller, electrostatic coating, and electrodeposition coating. The thickness of the coating film is, for example, greater than or equal to 50 µm and less than or equal to 500 µm, and preferably greater than or equal to 100 µm and less than or equal to 400 µm. Examples of the object to be coated include a ship and an in-water structure. Examples of the in-water structure include various fish nets such as fish nets for fanning and other fishing equipment; harbor facilities; oil-fences; intake equipment of an electric generation plant or the like; piping such as water conduits for cooling; bridges, buoyage; industrial water system facilities; and submarine bases. The object to be coated is preferably an underwater moving body, and examples of the underwater moving body include ships, fishing nets, and fishing equipment.

An application surface of the object to be coated may be pretreated as necessary, or on a primer film of another paint such as an antirust paint (anticorrosion paint) formed on an object to be coated, a coating film formed from the coating composition of the present invention may be formed to produce a composite film.

According to the coating composition of the present invention, the silicon atom-containing resin itself serving as a vehicle can exhibit good antifouling performance, which makes it possible to eliminate the addition of antifouling agent, or to reduce the amount of addition thereof. Therefore, according to the coating composition of the present invention, it is possible to form a clear (highly transparent) antifouling coating film.

An antifouling film formed from a conventional antifouling coating composition mainly containing a large amount of cuprous oxide as an antifouling agent generally takes on a reddish color phase due to the contained cuprous oxide, and the color phase thereof is limited; however, according to the present invention, various applications utilizing the transparency of the obtained coating film are possible. In forming a clear coating film, it is preferred that the coating composition of the present invention does not contain a coloring pigment.

For example, in the composite film including a primer film formed from an antirust paint or the like and a coating film of the present invention formed on the primer film, by using a clear antifouling film as the coating film of the present invention and those having various color phases as the antirust paint, it is possible to provide a coated object such as a ship having a composite film-formed surface having a color phase that is not conventionally realized, while having antifouling property. Also by forming an intermediate film of a paint having various color phases between the primer film of an antirust paint or the like and the clear antifouling film, it is possible to provide a coated object having a color phase that is not conventionally realized.

As the paint forming the intermediate film, for example, various paints such as an antifouling paint, an epoxy resin paint, a urethane resin paint, a (meth)acrylic resin paint, a chlorinated rubber paint, an alkyd resin paint, a silicon resin paint, and a fluorine resin paint may be used. The antifouling paint forming the intermediate film may be the coating composition of the present invention, or a different antifouling coating composition such as a conventional antifouling coating composition containing a relatively large amount of antifouling agent.

The intermediate film may be formed on the entire surface of the primer film, or may be formed on part of the surface. The intermediate film and the primer film may be a used old coating film. In this case, the coating composition of the present invention and a coating film formed therefrom may be used for repairing the old coating film.

Also by forming the intermediate film between the primer film of an antirust paint or the like and the clear antifouling film into the form of, for example, a character, pattern, design, or picture having various color phases, various design features can be imparted to the coated object. By interposing a film or a seal member in the form of a character, pattern, design, or picture having various color phases, in place of the intermediate film interposed between the primer film and the clear antifouling film, various design features can be imparted to the coated object.

EXAMPLES

The present invention will be described below in more detail by way of examples and comparative examples, but the present invention is not limited thereto.

Resin Production Examples S1 to S12 and T1 to T10: Production of Resins S1 to S12 and T1 to T10

To a four-necked flask equipped with a thermometer, a condenser, a stirrer, a dropping funnel, a nitrogen inlet tube, and a temperature controller, [A] parts by mass of xylene was added as a solvent and maintained at [B]° C. A mixture liquid containing monomers (total: 100 parts by mass) shown in Table 3 or Table 4 in amounts (unit: parts by mass) shown in Table 3 or Table 4, [C] parts by mass of xylene as a solvent, and [D] parts by mass of tert-butylperoxy-2-ethylhexanoate as a radical polymerization initiator was added to the dropping funnel of the four-necked flask. The mixture liquid was added dropwise to the four-necked flask at a constant velocity over [E] hours, and incubated for [F] minutes after completion of the dropwise addition. Then, a mixture liquid containing [G] parts by mass of xylene and [H] parts by mass of tert-butylperoxy-2-ethylhexanoate was added dropwise to the four-necked flask at a constant velocity over 30 minutes, and incubated for [I] hours after end of the dropwise addition, to obtain a resin composition (solution) containing a resin.

Numerical values of the above [A] to [I] in each of resin production examples S1 to S12 and T1 to T10 are summarized in Table 1 and Table 2.

TABLE 1

| | Resin production examples | | | | | | | | | | | |
|---|---|---|---|---|---|---|---|---|---|---|---|---|
| | S1 | S2 | S3 | S4 | S5 | S6 | S7 | S8 | S9 | S10 | S11 | S12 |
| Resin No. | S1 | S2 | S3 | S4 | S5 | S6 | S7 | S8 | S9 | S10 | S11 | S12 |
| [A] | 50 | 50 | 50 | 70 | 80 | 80 | 70 | 60 | 60 | 50 | 50 | 50 |
| [B] | 95 | 95 | 95 | 100 | 105 | 105 | 105 | 100 | 95 | 95 | 95 | 95 |
| [C] | 10 | 20 | 10 | 25 | 15 | 15 | 25 | 10 | 10 | 20 | 10 | 15 |
| [D] | 1.1 | 1.0 | 1.2 | 1.5 | 1.0 | 1.5 | 1.5 | 1.2 | 1.5 | 1.5 | 1.5 | 1.5 |
| [E] | 3 | 3 | 3 | 3 | 4 | 4 | 3 | 4 | 3 | 3 | 3 | 3 |
| [F] | 60 | 70 | 80 | 90 | 60 | 60 | 120 | 60 | 90 | 90 | 90 | 90 |
| [G] | 40 | 30 | 40 | 5 | 5 | 5 | 5 | 30 | 30 | 30 | 40 | 35 |
| [H] | 0.2 | 0.2 | 0.3 | 0.3 | 0.2 | 0.3 | 0.3 | 0.2 | 0.3 | 0.3 | 0.3 | 0.3 |
| [I] | 1.5 | 1.5 | 1.5 | 1.0 | 1.0 | 1.0 | 1.5 | 1.0 | 1.5 | 2.0 | 1.0 | 1.5 |

TABLE 2

| | Resin production examples | | | | | | | | | |
|---|---|---|---|---|---|---|---|---|---|---|
| | T1 | T2 | T3 | T4 | T5 | T6 | T7 | T8 | T9 | T10 |
| Resin No. | T1 | T2 | T3 | T4 | T5 | T6 | T7 | T8 | T9 | T10 |
| [A] | 50 | 40 | 55 | 50 | 50 | 50 | 60 | 50 | 50 | 50 |
| [B] | 95 | 100 | 100 | 100 | 95 | 95 | 100 | 100 | 98 | 98 |
| [C] | 10 | 20 | 10 | 10 | 10 | 10 | 10 | 10 | 10 | 10 |
| [D] | 1.5 | 1.5 | 1.0 | 1.5 | 1.0 | 1.0 | 1.0 | 1.5 | 1.5 | 1.5 |
| [E] | 3 | 3 | 3 | 3 | 3 | 3 | 3 | 3 | 3 | 3 |
| [F] | 30 | 30 | 30 | 30 | 30 | 30 | 30 | 30 | 30 | 30 |
| [G] | 40 | 40 | 35 | 40 | 40 | 40 | 30 | 40 | 40 | 40 |
| [H] | 0.3 | 0.3 | 0.3 | 0.3 | 0.3 | 0.3 | 0.2 | 0.2 | 0.2 | 0.2 |
| [I] | 2.0 | 2.0 | 1.0 | 1.5 | 2.0 | 1.0 | 1.0 | 1.0 | 1.5 | 1.0 |

Hereinafter, resins obtained in the resin production examples S1 to S12 are also respectively referred to as "resins S1 to S12", and resin compositions (solutions) obtained in the resin production examples S1 to S12 are also respectively referred to as "resin compositions S1 to S12". Resins obtained in the resin production examples T1 to T10 are also respectively referred to as "resins T1 to T10", and resin compositions (solutions) obtained in the resin production examples T1 to T10 are also respectively referred to as "resin compositions T1 to T10".

Monomers used in the resin production examples S1 to S12 and T1 to T10 and use amounts (parts by mass) thereof are shown in Tables 3 and 4. In Tables 3 and 4, a monomer (a') means a monomer including a silicon atom-containing group selected from the group consisting of a group represented by a formula (I), a group represented by a formula (II), a group represented by a formula (III), and a group represented by a formula (IV), but having a molecular weight (number average molecular weight) of less than or equal to 2500, and a numerical value in a parenthesis for each monomer belonging to a monomer (a) and the monomer (a') is the number average molecular weight of the monomer. The same applies to Table 6.

In Tables 3 and 4, other monomer means a monomer that does not belong to any of the monomer (a), the monomer (a'), the monomer (b), the monomer (c), and the monomer (d), and a numerical value in a parenthesis of each monomer belonging to the monomer (c) and the other monomer is the solubility parameter SP of a homopolymer of the monomer. The same applies to Table 6.

The number average molecular weights Mn of the obtained resins S1 to S12 and T1 to T10 and the solid contents of the resin compositions S1 to S12 and T1 to T10 were measured. The results are also shown in Tables 3 and 4. The measurement methods are as described below.

[i] Number Average Molecular Weight Mn

The number average molecular weight Mn of each of the monomer (a), the monomer (a'), and the resin is a number average molecular weight in terms of polystyrene measured by GPC. Measurement conditions were set as described below.

Apparatus: "HLC-8220GPC" manufactured by Tosoh Corporation

Column: TSKgel SuperHZM-M×2 columns

Eluent: tetrahydrofuran

Measurement temperature: 35° C.

Detector: RI

[ii] Solid Content

The solid content of the resin composition was calculated according to the following formula.

Solid content (% by mass)=100×(total mass of raw materials used for preparation of resin composition excluding solvent)/(mass of resin composition obtained)

TABLE 3

| | | \multicolumn{12}{c}{Resin production examples} |
| | | S1 | S2 | S3 | S4 | S5 | S6 | S7 | S8 | S9 | S10 | S11 | S12 |
|---|---|---|---|---|---|---|---|---|---|---|---|---|---|
| | Resin No. | S1 | S2 | S3 | S4 | S5 | S6 | S7 | S8 | S9 | S10 | S11 | S12 |
| Monomer (a) | (1) FM-0721 (5000) | 40 | | 21 | | | | | | 40 | 25 | 50 | |
| | (2) FM-0725 (10000) | | | | 30 | | | | | | | | 10 |
| | (3) KF-2012 (4600) | | 60 | | | | | 35 | 32 | | | | |
| | (4) X-22-2426 (12000) | | | | | | | | | | | | 16 |
| | (5) FM-7725 (10000) | | | | | | 20 | | | | | | |
| | (6) X-22-164B (3200) | | | | | 30 | | | | | | | |
| | (7) X-22-164E (7800) | | | | | | 10 | | 1 | | | | |
| Monomer (a') | (8) FM-0711 (1000) | | | | | | | | | | | | |
| | (9) X-22-174ASX (900) | | | | | | | | | | | | |
| | (10) X-22-174BX (2300) | | | | | | | | | | | | 16 |
| Monomer (b) | (11) HEMA (13.5) | 5 | | | | | | | | | | | |
| | (12) MEMA (10.7) | | 5 | | | | | 18 | | | | | |
| | (13) MEA (10.7) | | | | | | | 10 | | | | | |
| | (14) M-40G (13.7) | | | 5 | 20 | | | | | | | 5 | |
| | (15) M-90G (13.9) | | | | | 10 | | | 5 | | | | 6 |
| | (16) M-230G (21) | | | | | | 15 | | | | | | |
| | (17) SA (12.8) | | | | | | | | | | 5 | | |
| | (18) CB-1 (13.2) | | | | | | | | | 5 | | | |
| Monomer (c) | (19) t-BMA (9.4) | 20 | 5 | 20 | 10 | 10 | 10 | | | 29 | 10 | 24 | 30 |
| | (20) n-BMA (9.3) | | | 10 | | | | 10 | 5 | | | | |
| | (21) EHMA (8.3) | | | 5 | | | | | | | | | |
| | (22) n-BA (9.5) | | | | | | | 3 | 5 | | | | |
| Monomer (d) | (23) TIPSA | | | | | | | | | 15 | 40 | 15 | 14 |
| | (24) TIPSMA | | | | | | | | 20 | | | | |
| Other monomer | (25) MMA (10.7) | 35 | 30 | 39 | 30 | 50 | 35 | 34 | 32 | 6 | 15 | 6 | 8 |
| | (26) EA (10.5) | | | | 10 | | | | | 5 | 5 | | |
| | (27) AA (23.8) | | | | | | | | | | | | |
| | Total | 100 | 100 | 100 | 100 | 100 | 100 | 100 | 100 | 100 | 100 | 100 | 100 |
| | Number average molecular weight Mn (×10$^4$) | 1.0 | 1.1 | 0.9 | 0.8 | 2.2 | 2.5 | 1.2 | 2.1 | 0.9 | 1.1 | 1.0 | 0.8 |
| | Solid content (% by mass) | 50.2 | 50.5 | 50.0 | 49.8 | 49.9 | 50.0 | 50.2 | 50.0 | 50.1 | 49.7 | 50.2 | 49.9 |

TABLE 4

| | | \multicolumn{10}{c}{Resin production examples} |
| | | T1 | T2 | T3 | T4 | T5 | T6 | T7 | T8 | T9 | T10 |
|---|---|---|---|---|---|---|---|---|---|---|---|
| | Resin No. | T1 | T2 | T3 | T4 | T5 | T6 | T7 | T8 | T9 | T10 |
| Monomer (a) | (1) FM-0721 (5000) | | | | 50 | | | | | | |
| | (2) FM-0725 (10000) | | | | | 50 | | | | | |
| | (3) KF-2012 (4600) | | | | | | | | | | 18 |
| | (4) X-22-2426 (12000) | 46 | 50 | | | | | | | | |
| | (5) FM-7725 (10000) | | | | | | | | | | |
| | (6) X-22-164B (3200) | | | | | | | | | | |
| | (7) X-22-164E (7800) | | | | | | | | | | |
| Monomer (a') | (8) FM-0711 (1000) | | | 40 | | 50 | | | | | |
| | (9) X-22-174ASX (900) | | | | | | | | | 40 | |
| | (10) X-22-174BX (2300) | | | | | | | | | | |
| Monomer (b) | (11) HEMA (13.5) | | | | | | | | | | |
| | (12) MEMA (10.7) | | | | | | | | | | |
| | (13) MEA (10.7) | | | | | | | | | | |
| | (14) M-40G (13.7) | | | | | | | 36 | | | |
| | (15) M-90G (13.9) | | | 10 | | | | | 5 | | |
| | (16) M-230G (21) | | | | | | | | | | |
| | (17) SA (12.8) | | | | | | | | | 10 | |
| | (18) CB-1 (13.2) | | | | | | | | | | |
| Monomer (c) | (19) t-BMA (9.4) | | 20 | 30 | 30 | | | 10 | | | |
| | (20) n-BMA (9.3) | | | | | | | | | | 10 |
| | (21) EHMA (8.3) | | | | | | | | | | |
| | (22) n-BA (9.5) | | | | | | | 20 | 10 | | |

TABLE 4-continued

| | | Resin production examples | | | | | | | | | |
|---|---|---|---|---|---|---|---|---|---|---|---|
| | | T1 | T2 | T3 | T4 | T5 | T6 | T7 | T8 | T9 | T10 |
| Monomer (d) | (23) TIPSA | 23 | | | | | | | | | |
| | (24) TIPSMA | | | | | | | | | | |
| Other monomer | (25) MMA (10.7) | 31 | 30 | 50 | 20 | 20 | 50 | 64 | 40 | 40 | 50 |
| | (26) EA (10.5) | | | | | | | | 30 | 5 | 12 |
| | (27) AA (23.8) | | | | | | | | | | |
| | Total | 100 | 100 | 100 | 100 | 100 | 100 | 100 | 100 | 100 | 100 |
| Number average molecular weight Mn (×10⁴) | | 0.8 | 0.9 | 1.3 | 1.1 | 0.9 | 1.2 | 1.5 | 1.5 | 1.2 | 1.1 |
| Solid content (% by mass) | | 50.3 | 50.2 | 51.0 | 50.5 | 50.2 | 50.1 | 50.6 | 50.8 | 50.4 | 50.1 |

Resin Production Examples S13 and S14: Production of Resins S13 and S514

To a four-necked flask equipped with a thermometer, a condenser, a stirrer, a dropping funnel, a nitrogen inlet tube, and a temperature controller, [A] parts by mass of xylene was added as a solvent and maintained at [B]° C. A mixture liquid containing monomers (total: 100 pants by mass) shown in Table 6 in amounts (unit: parts by mass) shown in Table 6, 10 parts by mass of xylene as a solvent, and [C] parts by mass of tert-butylperoxy-2-ethylhexanoate as a radical polymerization initiator was added to the dropping funnel of the four-necked flask. The mixture liquid was added dropwise to the four-necked flask at a constant velocity over 3 hours, and incubated for 30 minutes after completion of the dropwise addition. Then, a mixture liquid containing [D] parts by mass of xylene and 0.3 parts by mass of tert-butylperoxy-2-ethylhexanoate was added dropwise to the four-necked flask at a constant velocity over 30 minutes, and incubated for [E] hours after end of the dropwise addition, to obtain a resin composition (solution) containing a resin including a carboxyl group. The solid content of the resin composition was [F]% by mass.

Subsequently, 100 parts by mass of the resin composition, [G] parts by mass of copper (II) acetate, [I] parts by mass of a compound [H], and 60 parts by mass of xylene were added to a similar reaction vessel, the temperature was raised to a reflux temperature, and reaction was continued for 18 hours while removing the mixture liquid of acetic acid, water, and a solvent in distillate and adding the same amount of xylene thereto. The end point of the reaction was determined by quantifying the amount of acetic acid in the distillate. After cooling the reaction liquid, n-butanol and xylene were added to obtain a resin composition (solution) containing a resin. The resin contained in the resin composition is obtained by converting the carboxyl group of the resin including the carboxyl group into —COO⁻Cu²⁺(⁻OOC—Y). Y is a structural moiety other than the carboxyl group of the compound [H].

Numerical values of the above [A] to [I] in each of resin production examples S13 and S14 are summarized in Table 5.

TABLE 5

| | Resin production examples | |
|---|---|---|
| Resin No. | S13 S13 | S14 S14 |
| [A] | 50 | 80 |
| [B] | 95 | 100 |
| [C] | 1.5 | 1.0 |

TABLE 5-continued

| | Resin production examples | |
|---|---|---|
| Resin No. | S13 S13 | S14 S14 |
| [D] | 40 | 10 |
| [E] | 1.5 | 1.0 |
| [F] | 50.5 | 50.1 |
| [G] | 13.1 | 24.6 |
| [H] | H1 | H2 |
| [I] | 22.1 | 33.2 |

$H_1$ and $H_2$ in Table 5 represent the following.

$H_1$: hydrogenated rosin (HYPALE CH, acid value 160 mgKOH/g, manufactured by Arakawa Chemical Industries, Ltd.)

$H_2$: Naphthenic acid (NA-200, acid value 200 mgKOH/g, manufactured by Yamato Yushi Kogyo K.K.)

Hereinafter, resins obtained in the resin production examples S13 and S14 are also respectively referred to as "resins S13 and S14", and resin compositions (solutions) obtained in the resin production examples S13 and S14 are also respectively referred to as "resin compositions S13 and S14".

Resin Production Example S15: Production of Resin S15

To a four-necked flask equipped with a thermometer, a condenser, a stirrer, a dropping funnel, a nitrogen inlet tube, and a temperature controller, 50 parts by mass of xylene was added as a solvent and maintained at 95° C. A mixture liquid containing monomers (total: 100 parts by mass) shown in Table 6 in amounts (unit: parts by mass) shown in Table 6, 10 parts by mass of xylene as a solvent, and 1.2 parts by mass of tert-butylperoxy-2-ethylhexanoate as a radical polymerization initiator was added to the dropping funnel of the four-necked flask. The mixture liquid was added dropwise to the four-necked flask at a constant velocity over 3 hours, and incubated for 30 minutes after completion of the dropwise addition. Then, a mixture liquid containing 40 parts by mass of xylene and 0.3 parts by mass of tert-butylperoxy-2-ethylhexanoate was added dropwise to the four-necked flask at a constant velocity over 30 minutes, and incubated for 1 hour after end of the dropwise addition, to obtain a resin composition (solution) containing a resin including a carboxyl group. The solid content of the resin composition was 50.2% by mass.

Subsequently, 100 parts by mass of the resin composition, 18.6 parts by mass of zinc (II) acetate, 33.2 parts by mass of naphthenic acid (NA-165, acid value 165 mgKOH/g, manufactured by Yamato Yushi Kogyo K.K.), and 60 parts by mass of xylene were added to a similar reaction vessel, the temperature was raised to a reflux temperature, and reaction was continued for 18 hours while removing the mixture liquid of acetic acid, water, and solvent in distillate and adding the same amount of xylene thereto. The end point of the reaction was determined by quantifying the amount of acetic acid in the distillate. After cooling the reaction liquid, n-butanol and xylene were added to obtain a resin composition (solution) containing a resin. The resin contained in the resin composition is obtained by converting the carboxyl group of the resin including the carboxyl group into —COO—$Zn^{2+}$(—OOC—Y). Y is a structural moiety other than the carboxyl group of naphthenic acid.

Hereinafter, a resin obtained in the resin production example S15 is also referred to as "resin S15", and a resin composition (solution) obtained in the resin production example S15 is also referred to as "resin composition S15".

Monomers used in the resin production examples S13 to S15 and use amounts (parts by mass) thereof are shown in Table 6. Table 6 shows monomers used for producing the resin including a carboxyl group.

The number average molecular weights Mn of the obtained resins S13 to S15 and the solid contents of the resin compositions S13 to S15 were measured according to the above measurement method. The results are also shown in Table 6. The number average molecular weight Mn was measured for a resin including a carboxyl group (resin before carrying out reaction for converting carboxyl group to —COO$^-$$Me^{2+}$(—OOC—Y)). Me is Cu or Zn.

TABLE 6

|  |  | Resin production examples | | |
|---|---|---|---|---|
|  | Resin No. | S13 / S13 | S14 / S14 | S15 / S15 |
| Monomer (a) | (1) FM-0721 (5000) | 35 |  |  |
|  | (2) FM-0725 (10000) |  |  | 30 |
|  | (3) KF-2012 (4600) |  | 15 |  |
|  | (4) X-22-2426 (12000) |  | 15 |  |
|  | (5) FM-7725 (10000) |  |  |  |
|  | (6) X-22-164B (3200) |  |  |  |
|  | (7) X-22-164E (7800) |  |  |  |
| Monomer (a') | (8) FM-0711 (1000) |  |  |  |
|  | (9) X-22-174ASX (900) |  | 7 |  |
|  | (10) X-22-174BX (2300) |  |  |  |
| Monomer (b) | (11) HEMA (13.5) |  |  |  |
|  | (12) MEMA (10.7) |  | 3 |  |
|  | (13) MEA (10.7) |  | 3 |  |
|  | (14) M-40G (13.7) |  |  |  |
|  | (15) M-90G (13.9) |  |  |  |
|  | (16) M-230G (21) | 1 |  |  |
|  | (17) SA (12.8) |  |  |  |
|  | (18) CB-1 (13.2) |  |  |  |
| Monomer (c) | (19) t-BMA (9.4) |  | 5 | 6 |
|  | (20) n-BMA (9.3) |  |  |  |
|  | (21) EHMA (8.3) |  |  | 10 |
|  | (22) n-BA (9.5) | 10 | 6 |  |
| Monomer (d) | (23) TIPSA | 19 |  |  |
|  | (24) TIPSMA |  | 5 |  |
| Other monomer | (25) MMA (10.7) | 26 | 27 | 30 |
|  | (26) EA (10.5) |  |  | 7 |
|  | (27) AA (23.8) | 9 | 17 | 14 |
|  | Total | 100 | 100 | 100 |
|  | Number average molecular weight Mn (×$10^4$) | 1.1 | 1.0 | 0.9 |
|  | Solid content (% by mass) | 50.5 | 50.1 | 50.2 |

The details of monomer abbreviations shown in Tables 3, 4, and 6 are as follows.

(1) FM-0721: "FM-0721" manufactured by JNC Corporation, one-terminal methacryloyloxyalkyl-modified organopolysiloxane, molecular weight: 5000, monomer in which, in the formula (I'), m=0, b=3, and n=65 are set, $R^1$ to $R^4$ and $R^{31}$ are methyl groups, and $R^5$ is a n-butyl group.

(2) FM-0725: "FM-0725" manufactured by JNC Corporation, one-terminal methacryloyloxyalkyl-modified organopolysiloxane, molecular weight: 10000, monomer in which, in the formula (I'), m=0, b=3, and n=132 are set, $R^1$ to $R^4$ and $R^{31}$ are methyl groups, and $R^5$ is a n-butyl group.

(3) KF-2012: "KF-2012" manufactured by Shin-Etsu Chemical Co., Ltd., one-terminal methacryloyloxyalkyl-modified organopolysiloxane, molecular weight: 4600, monomer in which, in the formula (I'), m=0 is set, and $R^1$ to $R^5$ and $R^{31}$ are methyl groups.

(4) X-22-2426: "X-22-2426" manufactured by Shin-Etsu Chemical Co., Ltd., one-terminal methacryloyloxyalkyl-modified organopolysiloxane, molecular weight: 12000, monomer in which, in the formula (I'), m=0 is set, and $R^1$ to $R^5$ and $R^{31}$ are methyl groups.

(5) FM-7725: "FM-7725" manufactured by JNC Corporation, both-terminal methacryloyloxyalkyl-modified organopolysiloxane, molecular weight: 10,000, monomer in which, in the formula (III'), q and s=0, f and g=3, and r=131 are set, and $R^9$ to $R^{12}$, and $R^{33}$ and $R^{34}$ are methyl groups.

(6) X-22-164B: "X-22-164B" manufactured by Shin-Etsu Chemical Co., Ltd., both-terminal methacryloyloxyalkyl-modified organopolysiloxane, molecular weight: 3200, monomer in which, in the formula (III'), q and s=0 is set, and $R^9$ to $R^{12}$, and $R^{33}$ and $R^{34}$ are methyl groups.

(7) X-22-164E: "X-22-164E" manufactured by Shin-Etsu Chemical Co., Ltd., both-terminal methacryloyloxyalkyl-modified organopolysiloxane, molecular weight: 7800, monomer in which, in the formula (III'), q and s=0 is set, and $R^9$ to $R^{12}$, and $R^{33}$ and $R^{34}$ are methyl groups.

(8) FM-0711: "FM-0711" manufactured by JNC Corporation, one-terminal methacryloyloxyalkyl-modified organopolysiloxane, molecular weight: 1000, monomer in which, in the formula (I'), m=0, b=3, and n=10 are set, $R^1$ to $R^4$ and $R^{31}$ are methyl groups, and $R^5$ is a n-butyl group.

(9) X-22-174ASX: "X-22-174ASX" manufactured by Shin-Etsu Chemical Co., Ltd., one-terminal methacryloyloxyalkyl-modified organopolysiloxane, molecular weight: 900, monomer in which, in the formula (I'), m=0 is set, and $R^1$ to $R^5$ and $R^{31}$ are methyl groups.
(10) X-22-174BX: "X-22-174BX" manufactured by Shin-Etsu Chemical Co., Ltd., one-terminal methacryloyloxyalkyl-modified organopolysiloxane, molecular weight: 2300, monomer in which, in the formula (I'), m=0 is set, and $R^1$ to $R^5$ and $R^{31}$ are methyl groups.
(11) HEMA: 2-hydroxyethyl methacrylate (SP: 13.5)
(12) MEMA: 2-methoxyethyl methacrylate (SP: 10.7)
(13) MEA: 2-methoxyethyl acrylate (SP: 10.7)
(14) M-40G: methoxy polyethylene glycol methacrylate (the number of repetitions of oxyethylene chain=4, SP: 13.7)
(15) M-90G: methoxy polyethylene glycol methacrylate (the number of repetitions of oxyethylene chain=9, SP: 13.9)
(16) M-230G: methoxy polyethylene glycol methacrylate (the number of repetitions of oxyethylene chain=23, SP: 21)
(17) SA: methacryloyloxyethyl succinic acid (SP: 12.8)
(18) CB-1: methacryloyloxyethyl phthalic acid (SP: 13.2)
(19) t-BMA: tert-Butyl methacrylate (SP: 9.4)
(20) n-BMA: n-Butyl methacrylate (SP: 9.3)
(21) EHMA: 2-ethylhexyl methacrylate (SP: 8.3)
(22) n-BA: n-Butyl acrylate (SP: 9.5)
(23) TIPSA: Triisopropylsilyl acrylate
(24) TIPSMA: Triisopropylsilyl methacrylate
(25) MMA: Methyl methacrylate (SP: 10.7)
(26) EA: ethyl acrylate (SP: 10.5)
(27) AA: Acrylic acid (SP: 23.8)

In the above, the SP is a solubility parameter of a homopolymer of the monomer, and is measured according to the method described above.

Examples 1 to 19, Comparative Examples 1 to 11

According to the formulations (parts by mass) of Tables 7 to 9, antifouling coating compositions were prepared by mixing any one of the resin compositions obtained in production examples, and other ingredients shown in Tables 7 to 9 using a high-speed disperser. Formulation amounts (parts by mass) are shown as they are in Tables 7 to 9. When a solvent or the like is contained, the formulation amounts contain the amount of the solvent.

(Evaluation of Antifouling Coating Composition)

[A] Evaluation of Dynamic Antifouling Property of Coating Film Formed from Antifouling Coating Composition (Open Drum Test)

The antifouling coating compositions obtained in Examples and Comparative Examples were applied to a blasted plate previously coated with an antirust paint such that the dry coating thickness was 300 μm. The plate was left to stand in a room for two days and two nights for drying to obtain a test plate including an antifouling coating film.

A test in which the obtained test plate was attached to the side surface of a rotary cylinder and rotated in natural sea water such that the speed of the surface of the test plate was about 10 knots per hour was performed for 24 months. The attachment area of marine organisms was determined and evaluated according to the following criteria. The evaluation results at 6 months, 12 months, 18 months, and 24 months in the test are shown in Tables 7 to 9. The evaluation result is preferably greater than or equal to 3.

5: The attachment area of marine organisms is greater than or equal to 0% and less than 5%.
4: The attachment area of marine organisms is greater than or equal to 5% and less than 10%.
3: The attachment area of marine organisms is greater than or equal to 10% and less than 15%.
2: The attachment area of marine organisms is greater than or equal to 15% and less than 30%.
1: The attachment area of marine organisms is greater than or equal to 30%.

[b] Evaluation of Static Antifouling Property of Coating Film Formed from Antifouling Coating Composition (Raft Static Antifouling Property Test)

The antifouling coating compositions obtained in Examples and Comparative Examples were applied to a blasted plate previously coated with an antirust paint such that the dry coating thickness was 300 μm. The plate was left to stand in a room for two days and two nights for drying to obtain a test plate including an antifouling coating film.

An organism adhesion test in which the obtained test plate was immersed in a raft installed in Aioi Bay, Ako City, Hyogo Prefecture, was performed for 24 months.

The adhesion area of marine organisms was determined and evaluated according to the following criteria. The evaluation results at 6 months, 12 months, 18 months, and 24 months in the test are shown in Tables 7 to 9. The evaluation result is preferably greater than or equal to 3.

5: The attachment area of marine organisms is greater than or equal to 0% and less than 5%.
4: The attachment area of marine organisms is greater than or equal to 5% and less than 10%.
3: The attachment area of marine organisms is greater than or equal to 10% and less than 15%.
2: The attachment area of marine organisms is greater than or equal to 15% and less than 30%.
1: The attachment area of marine organisms is greater than or equal to 30%.

[c] Softening Resistance of Coating Film

The antifouling coating compositions obtained in Examples and Comparative Examples were applied to a blasted plate previously coated with an antirust paint such that the dry coating thickness was 300 μm. The plate was left to stand in a room for two days and two nights for drying to obtain a test plate including an antifouling coating film. The obtained test plate was immersed in a raft installed in Aioi Bay, Ako City, Hyogo Prefecture, for a total of 12 months, and the softening resistance of the coating film was evaluated according to the following criteria. The softening resistance was performed by touching the coating film of the test plate with fingers. The evaluation results are shown in Tables 7 to 9. The evaluation result is preferably greater than or equal to 3. It is considered that the softening of the coating film is caused by swelling of the coating film due to water absorption.

5: Film softening is not confirmed even when the immersion period is 12 months.
4: Film softening is confirmed after the immersion period of greater than 7 months and less than 12 months.
3: Film softening is confirmed after the immersion period of greater than 3 months and less than or equal to 7 months.
2: Film softening is confirmed after the immersion period of greater than 1 month and less than or equal to 3 months.
1: Film softening is confirmed after the immersion period of less than or equal to 1 month.

TABLE 7

|  |  | Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Resin composition | | S1 | S1 | S1 | S1 | S2 | S3 | S4 | S5 | S6 | S7 | S7 |
| | | 95.64 | 91.53 | 87.17 | 62.64 | 87.17 | 87.17 | 87.17 | 87.17 | 87.17 | 87.17 | 77.17 |
| Defoaming agent | | | 3.00 | 3.00 | 25.00 | 3.00 | 3.00 | 3.00 | 3.00 | 3.00 | 3.00 | 3.00 |
| Plasticizer | | | | | | | | | | | | 10.00 |
| Pigment 1 | | 0.36 | | 0.36 | 0.36 | 0.36 | 0.36 | 0.36 | 0.36 | 0.36 | 0.36 | 0.36 |
| Pigment 2 | | 4.00 | | 4.00 | 4.00 | 4.00 | 4.00 | 4.00 | 4.00 | 4.00 | 4.00 | 4.00 |
| Anti-sagging agent | | | 5.47 | 5.47 | 8.00 | 5.47 | 5.47 | 5.47 | 5.47 | 5.47 | 5.47 | 5.47 |
| Total | | 100.00 | 100.00 | 100.00 | 100.00 | 100.00 | 100.00 | 100.00 | 100.00 | 100.00 | 100.00 | 100.00 |
| | | | | | [Antifouling coating composition] | | | | | | | |
| Dynamic | 6 months | 4 | 5 | 5 | 4 | 5 | 5 | 5 | 5 | 5 | 5 | 5 |
| antifouling | 12 months | 3 | 5 | 5 | 4 | 5 | 5 | 5 | 5 | 5 | 5 | 4 |
| property | 18 months | 3 | 4 | 4 | 4 | 4 | 4 | 4 | 4 | 4 | 4 | 4 |
| | 24 months | 3 | 4 | 4 | 4 | 4 | 4 | 4 | 4 | 4 | 3 | 4 |
| Static | 6 months | 4 | 5 | 5 | 4 | 5 | 5 | 5 | 5 | 5 | 5 | 5 |
| antifouling | 12 months | 3 | 5 | 5 | 4 | 5 | 5 | 5 | 5 | 5 | 5 | 4 |
| property | 18 months | 3 | 4 | 4 | 4 | 4 | 4 | 4 | 4 | 4 | 4 | 4 |
| | 24 months | 3 | 4 | 4 | 4 | 4 | 4 | 4 | 4 | 4 | 3 | 4 |
| Softening resistance | | 5 | 5 | 5 | 5 | 5 | 5 | 4 | 5 | 5 | 3 | 5 |

TABLE 8

|  |  | Examples | | | | | | | |
|---|---|---|---|---|---|---|---|---|---|
|  |  | 12 | 13 | 14 | 15 | 16 | 17 | 18 | 19 |
| Resin composition | | S8 | S9 | S10 | S11 | S12 | S13 | S14 | S15 |
| | | 87.17 | 87.17 | 87.17 | 87.17 | 87.17 | 87.17 | 87.17 | 87.17 |
| Defoaming agent | | 3.00 | 3.00 | 3.00 | 3.00 | 3.00 | 3.00 | 3.00 | 3.00 |
| Plasticizer | | | | | | | | | |
| Pigment 1 | | 0.36 | 0.36 | 0.36 | 0.36 | 0.36 | 0.36 | 0.36 | 0.36 |
| Pigment 2 | | 4.00 | 4.00 | 4.00 | 4.00 | 4.00 | 4.00 | 4.00 | 4.00 |
| Anti-sagging agent | | 5.47 | 5.47 | 5.47 | 5.47 | 5.47 | 5.47 | 5.47 | 5.47 |
| Total | | 100.00 | 100.00 | 100.00 | 100.00 | 100.00 | 100.00 | 100.00 | 100.00 |
| | | | | [Antifouling coating composition] | | | | | |
| Dynamic | 6 months | 5 | 5 | 5 | 5 | 5 | 5 | 5 | 5 |
| antifouling | 12 months | 5 | 5 | 5 | 5 | 5 | 5 | 5 | 5 |
| property | 18 months | 5 | 5 | 5 | 5 | 5 | 4 | 5 | 5 |
| | 24 months | 5 | 5 | 5 | 5 | 5 | 4 | 5 | 5 |
| Static | 6 months | 5 | 5 | 5 | 5 | 5 | 5 | 5 | 5 |
| antifouling | 12 months | 5 | 5 | 5 | 5 | 5 | 5 | 5 | 5 |
| property | 18 months | 5 | 5 | 5 | 5 | 5 | 4 | 5 | 5 |
| | 24 months | 5 | 5 | 5 | 5 | 5 | 4 | 5 | 5 |
| Softening resistance | | 5 | 5 | 5 | 5 | 5 | 4 | 5 | 5 |

TABLE 9

|  |  | Comparative Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Resin composition | | T1 | T1 | T2 | T3 | T4 | T5 | T6 | T7 | T8 | T9 | T10 |
| | | 95.64 | 87.17 | 87.17 | 87.17 | 87.17 | 87.17 | 87.17 | 87.17 | 87.17 | 87.17 | 87.17 |
| Defoaming agent | | | 3.00 | 3.00 | 3.00 | 3.00 | 3.00 | 3.00 | 3.00 | 3.00 | 3.00 | 3.00 |
| Plasticizer | | | | | | | | | | | | |
| Pigment 1 | | 0.36 | 0.36 | 0.36 | 0.36 | 0.36 | 0.36 | 0.36 | 0.36 | 0.36 | 0.36 | 0.36 |
| Pigment 2 | | 4.00 | 4.00 | 4.00 | 4.00 | 4.00 | 4.00 | 4.00 | 4.00 | 4.00 | 4.00 | 4.00 |
| Anti-sagging agent | | | 5.47 | 5.47 | 5.47 | 5.47 | 5.47 | 5.47 | 5.47 | 5.47 | 5.47 | 5.47 |
| Total | | 100.00 | 100.00 | 100.00 | 100.00 | 100.00 | 100.00 | 100.00 | 100.00 | 100.00 | 100.00 | 100.00 |
| | | | | | [Antifouling coating composition] | | | | | | | |
| Dynamic | 6 months | 2 | 2 | 2 | 2 | 2 | 2 | 2 | 1 | 1 | 2 | 2 |
| antifouling | 12 months | 1 | 2 | 2 | 2 | 2 | 2 | 2 | 1 | 1 | 2 | 2 |
| property | 18 months | 1 | 1 | 1 | 1 | 1 | 1 | 1 | 1 | 1 | 1 | 1 |
| | 24 months | 1 | 1 | 1 | 1 | 1 | 1 | 1 | 1 | 1 | 1 | 1 |

TABLE 9-continued

| | | Comparative Examples | | | | | | | | | | |
|---|---|---|---|---|---|---|---|---|---|---|---|
| | | 1 | 2 | 3 | 4 | 5 | 6 | 7 | 8 | 9 | 10 | 11 |
| Static antifouling property | 6 months | 1 | 2 | 2 | 2 | 2 | 2 | 2 | 1 | 1 | 2 | 2 |
| | 12 months | 1 | 2 | 2 | 2 | 2 | 2 | 2 | 1 | 1 | 2 | 2 |
| | 18 months | 1 | 1 | 1 | 1 | 1 | 1 | 1 | 1 | 1 | 1 | 1 |
| | 24 months | 1 | 1 | 1 | 1 | 1 | 1 | 1 | 1 | 1 | 1 | 1 |
| Softening resistance | | 5 | 5 | 5 | 5 | 5 | 4 | 5 | 1 | 5 | 5 | 5 |

The details of the components shown in Tables 7 to 9 are as described below.
(1) Defoaming agent: "BYK-066N" manufactured by BYK, nonvolatile content: 0.7% by mass
(2) Plasticizer: "Lutonal A25" manufactured by BASF, polyvinyl ethyl ether, nonvolatile content: 95% by mass
(3) Pigment 1: "T1-PURE R-900" manufactured by Du Pont, titanium oxide pigment
(4) Pigment 2: "Bayferox 130" manufactured by LANXESS CORPORATION, iron oxide red pigment
(5) Anti-sagging agent: "Monoral 3300" manufactured by HS CHEM, nonvolatile content: 20% by mass

The invention claimed is:
1. An antifouling coating composition comprising a silicon atom-containing resin,
wherein
the silicon atom-containing resin includes:
a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below;
a constituent unit (B) derived from a monomer (b) which is a (meth)acrylic acid ester represented by a formula (b) below; and
a constituent unit (C) derived from a monomer (c) other than the monomer (a) and the monomer (b),
the monomer (a) has a number average molecular weight of greater than 2500,
a content of the constituent unit (A) is greater than 20% by mass in all constituent units contained in the silicon atom-containing resin,
the monomer (c) is a monomer having a homopolymer solubility parameter SP of greater than or equal to 9.0 $(cal/cm^3)^{1/2}$ and less than or equal to 9.5 $(cal/cm^3)^{1/2}$ and having no cyclic structure, and
a content of the constituent unit (C) is greater than 2% by mass in all constituent units contained in the silicon atom-containing resin:

[Chemical formula 1]

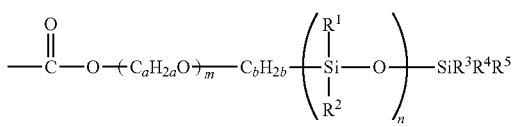
(I)

[in the formula (I), a and b each independently represent an integer of 2 to 5, m represents an integer of 0 to 50, and n represents an integer of 3 to 270; and $R^1$ to $R^5$ each independently represent an alkyl group, an alkoxy group, a phenyl group, a substituted phenyl group, a phenoxy group, or a substituted phenoxy group];

[Chemical formula 2]

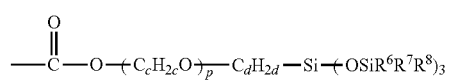
(II)

[in the formula (II), c and d each independently represent an integer of 2 to 5, and p represents an integer of 0 to 50; $R^6$, $R^7$, and $R^8$ each independently represent an alkyl group, $R^a$, or $R^b$;

$R^a$ is

[Chemical formula 3]

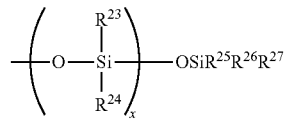

(in the formula, x represents an integer of 0 to 200, and $R^{23}$ to $R^{27}$ are the same or different and each represent an alkyl group);

$R^b$ is

[Chemical formula 4]

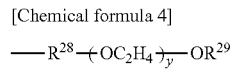

(in the formula, y represents an integer of 1 to 200, and $R^{28}$ and $R^{29}$ are the same or different and each represent an alkyl group)];

[Chemical formula 5]

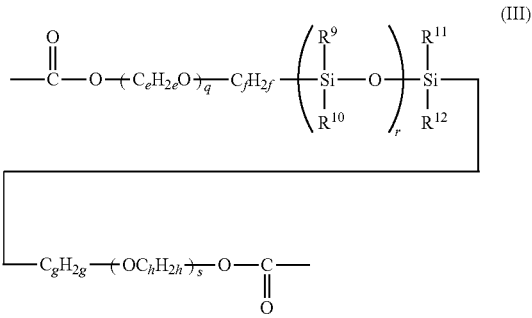

[in the formula (III), e, f, g, and h each independently represent an integer of 2 to 5, q and s each independently represent an integer of 0 to 50, and r represents an integer of 3 to 270; $R^9$ to $R^{12}$ each independently represent an alkyl group, an alkoxy group, a phenyl group, a substituted phenyl group, a phenoxy group, or a substituted phenoxy group];

[Chemical formula 6]

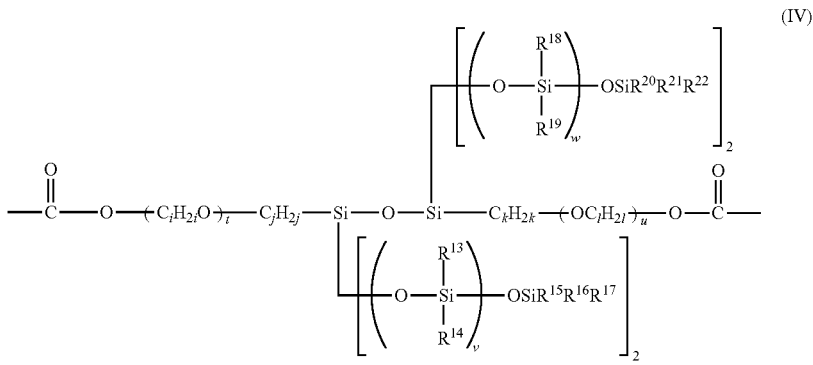

[in the formula (IV), i, j, k, and l each independently represent an integer of 2 to 5, t and u each independently represent an integer of 0 to 50, and v and w each independently represent an integer of 0 to 70; and $R^{13}$ to $R^{22}$ are the same or different and each represent an alkyl group]; and

[in the formula (b), $R^A$ represents a hydrogen atom or a methyl group; and $R^B$ represents a monovalent group including one or more kinds selected from the group consisting of a carboxy group, and an oxyalkylene chain], and
wherein
the antifouling coating composition further comprises at least one kind of solvent selected from the group consisting of hydrocarbons, ethers, esters, ketones and alcohols, the silicon atom-containing resin is dissolved in the solvent, and
wherein the homopolymer solubility parameter SP is measured by the following method:
at a measurement temperature of 20° C., 0.5 g of a homopolymer is weighed in a 100 mL beaker, and 10 mL of acetone is added using a whole pipette and dissolved with a magnetic stirrer to prepare a diluted solution;
n-hexane is gradually added dropwise to the diluted solution using a 50 mL burette, and the point at which turbidity occurs in the diluted solution is defined as a dropping amount of the n-hexane;
ion-exchanged water is gradually added dropwise to a second portion of the diluted solution, and the point at which turbidity occurs in the diluted solution is defined as a dropping amount of the ion-exchanged water; and
calculate the homopolymer solubility parameter SP from the dropping amount of each of the n-hexane and ion-exchanged water until the turbidity point is reached.

2. The antifouling coating composition according to claim 1, wherein $R^B$ in the formula (b) represents a monovalent group containing an oxyalkylene chain.

3. The antifouling coating composition according to claim 1, wherein the monomer (a) is at least one kind selected from the group consisting of a monomer (a1) represented by a formula (I') below, a monomer (a2) represented by a formula (II') below, a monomer (a3) represented by a formula (III') below, and a monomer (a4) represented by a formula (IV') below:

[Chemical formula 7]

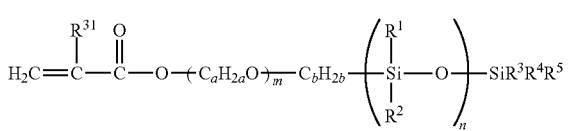

[in the formula (I'), $R^{31}$ represents a hydrogen atom or a methyl group, and a, b, m, n and $R^1$ to $R^5$ represent the same meaning as previously mentioned];

[Chemical formula 8]

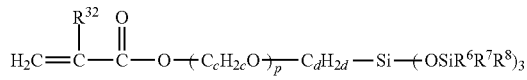
(II')

[in the formula (II'), $R^{32}$ represents a hydrogen atom or a methyl group, and c, d, p, and $R^6$ to $R^8$ represent the same meaning as previously mentioned];

[Chemical formula 9]

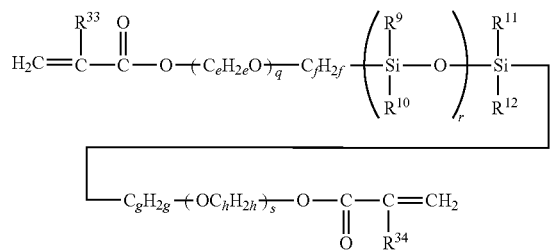
(III')

[in the formula (III'), $R^{33}$ and $R^{34}$ each independently represent a hydrogen atom or a methyl group, and e, f, g, h, q, r, s and $R^9$ to $R^{12}$ represent the same meaning as previously mentioned]; and

[Chemical formula 10]

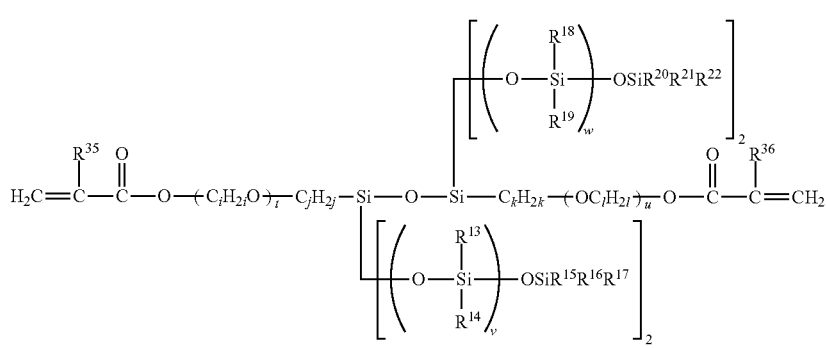
(IV')

[in the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned].

4. The antifouling coating composition according to claim 1, further comprising a constituent unit (D) derived from a monomer (d) having a triorganosilyloxycarbonyl group.

5. The antifouling coating composition according to claim 4, wherein the monomer (d) is a monomer (d1) represented by a formula (VII') below:

[Chemical formula 11]

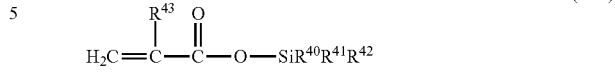
(VII')

[in the formula (VII'), $R^{43}$ represents a hydrogen atom or a methyl group, and $R^{40}$, $R^{41}$ and $R^{42}$ are the same or different and each represent a hydrocarbon group having 1 to 20 carbon atoms].

6. The antifouling coating composition according to claim 1, wherein a content of the constituent unit (B) is greater than or equal to 1% by mass and less than or equal to 30% by mass in all constituent units contained in the silicon atom-containing resin.

7. The antifouling coating composition according to claim 1, wherein the monomer (b) has a homopolymer solubility parameter SP of greater than or equal to 10.0 $(cal/cm^3)^{1/2}$.

8. The antifouling coating composition according to claim 1, further comprising at least one kind selected from the group consisting of a defoaming agent and an anti-sagging agent.

9. The antifouling coating composition according to claim 1, wherein the silicon atom-containing resin further includes a constituent unit (E) derived from a monomer (e) having at least one kind of metal atom-containing group selected from the group consisting of a group represented by a formula (V) below and a group represented by a formula (VI) below:

[Chemical formula 12]

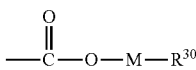
(V)

[in the formula (V), M represents a divalent metal atom, and $R^{30}$ represents an organic acid residue or an alcohol residue]; and

[Chemical formula 13]

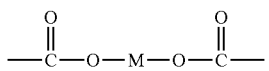
(VI)

[in the formula (VI), M represents a divalent metal atom].

10. The antifouling coating composition according to claim 9, wherein the monomer (e) is at least one kind selected from the group consisting of a monomer (e1) represented by a formula (V') below and a monomer (e2) represented by a formula (VI') below:

[Chemical formula 14]

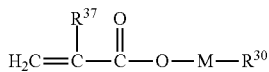
(V')

[in the formula (V'), $R^{37}$ represents a hydrogen atom or a methyl group, and M and $R^{30}$ represent the same meaning as previously mentioned]; and

[Chemical formula 15]

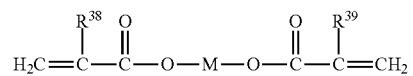
(VI')

[in the formula (VI'), $R^{38}$ and $R^{39}$ each independently represent a hydrogen atom or a methyl group, and M represents the same meaning as previously mentioned].

11. A coating film formed from the antifouling coating composition according to claim 1.

12. A composite coating film comprising a primer coating film formed from an antirust paint, and a coating film formed from the antifouling coating composition according to claim 1 and overlaid on the primer coating film.

13. A ship comprising the coating film according to claim 11.

14. An in-water structure comprising the coating film according to claim 11.

15. A ship comprising the composite coating film according to claim 12.

16. An in-water structure comprising the composite coating film according to claim 12.

* * * * *